United States Patent
Wise

(10) Patent No.: US 7,342,337 B2
(45) Date of Patent: *Mar. 11, 2008

(54) POWER GENERATING SYSTEMS

(75) Inventor: Richard J. Wise, Kelowna (CA)

(73) Assignee: Magnetic Torque International, Ltd., Bridgetown (BB)

(*) Notice: Subject to any disclaimer, the term of this patent is extended or adjusted under 35 U.S.C. 154(b) by 0 days.

This patent is subject to a terminal disclaimer.

(21) Appl. No.: 11/485,416

(22) Filed: Jul. 13, 2006

(65) Prior Publication Data

US 2007/0262666 A1    Nov. 15, 2007

Related U.S. Application Data

(60) Division of application No. 11/171,543, filed on Jul. 1, 2005, which is a continuation-in-part of application No. 10/758,000, filed on Jan. 16, 2004, now Pat. No. 6,930,421.

(60) Provisional application No. 60/440,622, filed on Jan. 17, 2003.

(51) Int. Cl.
*H02K 37/00* (2006.01)
*H02K 7/00* (2006.01)

(52) U.S. Cl. .................. 310/103; 310/112; 310/114

(58) Field of Classification Search .............. 310/74, 310/75 D, 103–105, 112, 114
See application file for complete search history.

(56) References Cited

U.S. PATENT DOCUMENTS

| 1,171,351 A | 2/1916 | Neuland |
| 1,863,294 A | 6/1932 | Bogia |
| 2,167,641 A | 8/1939 | Dewan |
| 2,233,060 A | 2/1941 | Parvin |
| 2,243,555 A | 5/1941 | Faus |
| 2,277,214 A | 3/1942 | Dodge |
| 2,378,129 A | 6/1945 | Chambers |
| 2,437,871 A * | 3/1948 | Wood .................. 310/103 |
| 2,481,172 A | 9/1949 | Staggs |
| 2,490,789 A | 12/1949 | Ellis |
| 2,640,166 A | 5/1953 | Zozulin et al. |
| 2,680,203 A | 6/1954 | Zozulin et al. |
| 2,722,617 A | 11/1955 | Cluwen et al |
| 2,754,438 A | 7/1956 | Zozulin et al. |
| 2,768,316 A | 10/1956 | Neiss |

(Continued)

FOREIGN PATENT DOCUMENTS

AU    9225377    4/1993

(Continued)

OTHER PUBLICATIONS

"Neogen Dynamo, an Experimental Design Project", Rex Herbert, Sep. 23, 2005.

*Primary Examiner*—Tran Nguyen
(74) *Attorney, Agent, or Firm*—Morgan, Lewis & Bockius LLP

(57) ABSTRACT

A power generating system includes a torque converter system receiving a rotational motion having a first torque from a source and producing a rotational output having a second torque different from the first torque, a transfer system having a first portion coupled to the rotational output of the torque converter system and a second portion magnetically coupled to the first portion, and a generator system coupled to the transfer system to produce and electrical output.

14 Claims, 29 Drawing Sheets

U.S. PATENT DOCUMENTS

| | | | |
|---|---|---|---|
| 2,845,157 A | 7/1958 | Gambell | |
| 2,902,612 A | 9/1959 | Whearley | |
| 2,949,552 A | 8/1960 | Benoit | |
| 2,979,630 A * | 4/1961 | Bishop et al. | 310/102 A |
| 2,993,159 A | 7/1961 | Devol | |
| 3,226,584 A * | 12/1965 | Pintell | 310/162 |
| 3,230,406 A | 1/1966 | Baudot | |
| 3,247,407 A | 4/1966 | Bruneel | |
| 3,267,310 A | 8/1966 | Ireland | |
| 3,331,973 A | 7/1967 | McClure | |
| 3,343,833 A | 9/1967 | Laing | |
| 3,378,710 A | 4/1968 | Martin, Jr. et al. | |
| 3,382,385 A | 5/1968 | Baudot | |
| 3,382,386 A | 5/1968 | Schaleppi | |
| 3,470,406 A | 9/1969 | Law | |
| 3,488,535 A | 1/1970 | Baermann | |
| 3,510,706 A | 5/1970 | Agaba | |
| 3,523,204 A | 8/1970 | Rand | |
| 3,531,709 A | 9/1970 | Nazare | |
| 3,587,015 A | 6/1971 | Mitchell | |
| 3,591,843 A | 7/1971 | Friedrich | |
| 3,624,439 A | 11/1971 | Tokutomi | |
| 3,645,650 A | 2/1972 | Laung | |
| 3,730,488 A | 5/1973 | Gardner, Jr. | |
| 3,731,984 A | 5/1973 | Habermann | |
| 3,796,898 A | 3/1974 | Kleinwacchter | |
| 3,814,962 A | 6/1974 | Baermann | |
| 3,832,581 A | 8/1974 | Hoffmann et al. | |
| 3,864,587 A | 2/1975 | Landry | |
| 3,869,626 A | 3/1975 | Puttock et al. | |
| 3,890,515 A | 6/1975 | Fehr et al. | |
| 3,936,683 A | 2/1976 | Walker | |
| 3,979,619 A | 9/1976 | Whiteley | |
| 4,082,969 A * | 4/1978 | Kelly | 310/103 |
| 4,104,552 A | 8/1978 | Tsergas | |
| 4,115,040 A * | 9/1978 | Knorr | 417/420 |
| 4,148,231 A | 4/1979 | Redzinski | |
| 4,167,684 A | 9/1979 | Kelly | |
| 4,169,983 A | 10/1979 | Felder | |
| 4,196,365 A | 4/1980 | Presley | |
| 4,207,487 A | 6/1980 | Beyersdorf | |
| 4,267,647 A * | 5/1981 | Anderson et al. | 434/301 |
| 4,303,843 A | 12/1981 | Arnoux et al. | |
| 4,358,693 A | 11/1982 | Palmer et al. | |
| 4,360,753 A | 11/1982 | Shannon | |
| 4,405,873 A * | 9/1983 | Nondahl | 310/156.56 |
| 4,456,858 A | 6/1984 | Loven | |
| 4,486,176 A | 12/1984 | Tardieu et al. | |
| 4,486,675 A | 12/1984 | Albert | |
| 4,532,447 A | 7/1985 | Cibié | |
| 4,629,921 A | 12/1986 | Gavaletz | |
| 4,649,307 A | 3/1987 | Bech | |
| 4,651,856 A | 3/1987 | Skrobisch | |
| 4,668,885 A * | 5/1987 | Scheller | 310/90.5 |
| 4,677,332 A * | 6/1987 | Heyraud | 310/184 |
| 4,751,486 A | 6/1988 | Minato | |
| 4,808,869 A | 2/1989 | Kopp | |
| 4,850,821 A | 7/1989 | Sakai | |
| 4,866,321 A | 9/1989 | Blanchard et al. | |
| 4,869,654 A | 9/1989 | Klaus | |
| 4,895,493 A | 1/1990 | Kletschka | |
| 4,996,457 A * | 2/1991 | Hawsey et al. | 310/268 |
| 5,013,949 A | 5/1991 | Mabe, Jr. | |
| 5,017,102 A | 5/1991 | Shimaguchi et al. | |
| 5,117,141 A | 5/1992 | Hawsey et al. | |
| 5,158,279 A | 10/1992 | Laffey et al. | |
| 5,184,040 A | 2/1993 | Lim | |
| 5,191,255 A | 3/1993 | Kloosterhouse et al. | |
| 5,193,953 A | 3/1993 | Jesinger | |
| 5,204,572 A | 4/1993 | Ferreira | |
| 5,304,881 A | 4/1994 | Flynn et al. | |
| 5,312,277 A | 5/1994 | Selmer | |
| 5,324,232 A | 6/1994 | Krampitz | |
| 5,334,899 A | 8/1994 | Skybyk | |
| 5,455,474 A | 10/1995 | Flynn | |
| 5,463,263 A | 10/1995 | Flynn | |
| 5,477,093 A | 12/1995 | Lamb | |
| 5,477,094 A | 12/1995 | Lamb | |
| 5,498,919 A | 3/1996 | Bahn | |
| 5,514,923 A | 5/1996 | Gossler et al. | |
| 5,569,111 A | 10/1996 | Cho et al. | |
| 5,569,967 A | 10/1996 | Rode | |
| 5,594,289 A | 1/1997 | Minato | |
| 5,597,119 A | 1/1997 | Gorney et al. | |
| 5,619,087 A | 4/1997 | Sakai | |
| 5,621,304 A | 4/1997 | Kiuchi et al. | |
| 5,646,467 A | 7/1997 | Floresta et al. | |
| 5,668,424 A | 9/1997 | Lamb | |
| 5,672,925 A | 9/1997 | Lipo et al. | |
| 5,675,203 A | 10/1997 | Schulze et al. | |
| 5,684,352 A | 11/1997 | Mita et al. | |
| 5,713,405 A | 2/1998 | Kashiwagi | |
| 5,722,911 A | 3/1998 | Ibaraki et al. | |
| 5,731,649 A | 3/1998 | Caamano | |
| 5,739,627 A | 4/1998 | Lamb | |
| 5,786,645 A | 7/1998 | Obidniak | |
| 5,788,004 A | 8/1998 | Friedmann et al. | |
| 5,793,137 A | 8/1998 | Smith | |
| 5,814,914 A | 9/1998 | Caamano | |
| 5,841,201 A | 11/1998 | Tabata et al. | |
| 5,848,678 A | 12/1998 | Johnston et al. | |
| 5,903,082 A | 5/1999 | Caamano | |
| 5,917,261 A | 6/1999 | Kawai | |
| 5,925,958 A | 7/1999 | Pirc | |
| 5,936,321 A | 8/1999 | Kameoka et al. | |
| 5,955,809 A | 9/1999 | Shah | |
| 5,962,942 A | 10/1999 | Pullen et al. | |
| 5,982,070 A | 11/1999 | Caamano | |
| 5,982,074 A | 11/1999 | Smith et al. | |
| 5,986,378 A | 11/1999 | Narita et al. | |
| 5,990,593 A | 11/1999 | Narita et al. | |
| 6,025,667 A | 2/2000 | Narita et al. | |
| 6,037,696 A | 3/2000 | Sromin et al. | |
| 6,047,456 A | 4/2000 | Yao et al. | |
| 6,049,197 A | 4/2000 | Caamano | |
| 6,054,788 A | 4/2000 | Dombrovski et al. | |
| 6,054,844 A | 4/2000 | Frank | |
| 6,084,322 A | 7/2000 | Rounds | |
| 6,142,418 A | 11/2000 | Weber et al. | |
| 6,154,013 A | 11/2000 | Caamano | |
| 6,157,147 A * | 12/2000 | Lin | 318/9 |
| 6,177,745 B1 | 1/2001 | Narita et al. | |
| 6,208,053 B1 | 3/2001 | Scott | |
| 6,209,672 B1 | 4/2001 | Severinsky | |
| 6,239,524 B1 | 5/2001 | Leibowitz | |
| 6,259,233 B1 | 7/2001 | Caamano | |
| 6,263,664 B1 | 7/2001 | Tanigawa et al. | |
| 6,274,959 B1 | 8/2001 | Uchiyama | |
| 6,323,576 B1 | 11/2001 | Applegate | |
| 6,373,162 B1 | 4/2002 | Liang et al. | |
| 6,407,466 B2 | 6/2002 | Caamano | |
| 6,411,001 B1 | 6/2002 | Henderson et al. | |
| 6,429,565 B1 | 8/2002 | Matsunobu et al. | |
| 6,460,360 B2 | 10/2002 | Hsieh | |
| 6,470,983 B1 | 10/2002 | Amano et al. | |
| 6,552,460 B2 | 4/2003 | Bales | |
| 6,570,824 B1 | 5/2003 | Born | |
| 6,605,883 B2 | 8/2003 | Isozaki et al. | |
| 6,633,106 B1 | 10/2003 | Swett | |
| 6,664,651 B1 | 12/2003 | Kotre et al. | |
| 6,700,263 B1 | 3/2004 | Kong et al. | |
| 6,703,743 B2 | 3/2004 | Kaneko et al. | |
| 6,717,324 B2 | 4/2004 | Chen | |
| 6,724,100 B1 | 4/2004 | Gabriel | |

| | | |
|---|---|---|
| 6,734,661 B2 | 5/2004 | Colby et al. |
| 6,762,526 B2 | 7/2004 | Isozaki et al. |
| 6,789,442 B2 | 9/2004 | Förch |
| 6,794,783 B2 | 9/2004 | Tu et al. |
| 6,803,696 B2 | 10/2004 | Chen |
| 6,841,909 B2 | 1/2005 | Six |
| 6,841,910 B2 | 1/2005 | Gery |
| 6,847,189 B2 | 1/2005 | Frank |
| 6,849,984 B2 | 2/2005 | Gallant |
| 6,867,514 B2 | 3/2005 | Fecera |
| 6,891,279 B2 | 5/2005 | Kazama |
| 6,891,306 B1 | 5/2005 | Soghomonian et al. |
| 6,930,421 B2 | 8/2005 | Wise |
| 7,024,963 B2 | 4/2006 | French |
| 7,105,968 B2 | 9/2006 | Nissen |
| 7,145,276 B2 | 12/2006 | Wise |
| 2002/0153795 A1 | 10/2002 | Matsunobu et al. |
| 2003/0048033 A1 | 3/2003 | Kobayashi |
| 2004/0041479 A1 | 3/2004 | French |
| 2004/0075358 A1 | 4/2004 | Furuse et al. |
| 2004/0135453 A1 | 7/2004 | Naito et al. |
| 2004/0150279 A1 | 8/2004 | Wise |
| 2004/0251757 A1 | 12/2004 | Porter, Sr. |
| 2005/0104465 A1 | 5/2005 | Darday |
| 2005/0127767 A1 | 6/2005 | Gallant |
| 2005/0258692 A1 | 11/2005 | Wise |
| 2006/0087187 A1 | 4/2006 | Wise |
| 2006/0111191 A1 | 5/2006 | Wise |
| 2006/0123936 A1 | 6/2006 | French |
| 2006/0226725 A1 | 10/2006 | Wise |
| 2006/0255676 A1 | 11/2006 | Wise |
| 2007/0007835 A1 | 1/2007 | Wise |

FOREIGN PATENT DOCUMENTS

| | | |
|---|---|---|
| CA | 2079056 | 9/1992 |
| CA | 2119934 | 3/1994 |
| DE | 2631354 | 1/1978 |
| DE | 38 24 619 | 1/1989 |
| DE | 3841012 | 6/1990 |
| DE | 42 11 740 | 10/1993 |
| DE | 20007580 | 8/2000 |
| EP | 0088909 | 9/1983 |
| EP | 0655637 | 5/1995 |
| EP | 0977343 | 2/2000 |
| EP | 0979945 | 2/2000 |
| EP | 1069671 | 1/2001 |
| FR | 2546253 | 11/1984 |
| GB | 2 094 560 | 9/1982 |
| GB | 2 216 189 | 10/1989 |
| JP | 60-091011 | 5/1985 |
| JP | 2-250657 | 10/1990 |
| JP | 04-185273 | 7/1992 |
| JP | 5-304763 | 11/1993 |
| JP | 08-275419 | 10/1996 |
| JP | 08-336274 | 12/1996 |
| JP | 11-063164 | 3/1999 |
| JP | 2000-197340 | 7/2000 |
| JP | 2004-140937 | 5/2004 |
| JP | 2005-114162 | 4/2005 |
| JP | 2005-114163 | 4/2005 |
| SU | 1486663 | 6/1989 |
| SU | 1551888 | 3/1990 |
| WO | 00/21184 | 4/2000 |
| WO | 00/50719 | 8/2000 |
| WO | 00/64031 | 10/2000 |
| WO | 02/31370 | 4/2002 |
| WO | 2006/105617 | 10/2006 |

* cited by examiner

POWER GENERATING SYSTEMS

This application is a Divisional of U.S. patent application Ser. No. 11/171,543, filed Jul. 1, 2005, which is a Continuation-In-Part of U.S. patent application Ser. No. 10/758/000 filed on Jan. 16, 2004 now U.S. Pat. No. 6,930,421, and which claims priority to U.S. Provisional Patent ion No. 60/440,622 filed on Jan. 17, 2003, which are hereby incorporated by reference in their entirety.

BACKGROUND OF THE INVENTION

1. Field of the Invention

The present invention relates to power generating systems. More specifically, the present invention relates to various power systems using torque converter and generator systems.

2. Discussion of the Related Art

In general, power generation systems make use of mechanical couplings to transmit rotational motion between drive shafts. However, due to frictional forces between the mechanical couplings heat is produced, thereby reducing the efficiency of the power generating systems. In addition, the frictional forces cause significant mechanical wear on all moving parts.

SUMMARY OF THE INVENTION

Accordingly, the present invention is directed to a power generating system using a torque converter that substantially obviates one or more of the problems due to limitations and disadvantages of the related art.

An object of the present invention is to provide a power generating system having an increased output.

Another object of the present invention is to provide a power generating system having reduced frictional wear.

Another object of the present invention is to provide a power generating system that does not generate heat.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system having a first portion coupled to the rotational output of the torque converter system and a second portion magnetically coupled to the first portion, and a generator system coupled to the transfer system to produce an electrical output.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a generator system coupled to the rotational output of the torque converter system to produce electrical and rotational outputs, a transfer system having a first portion coupled to the rotational output of the generator system and a second portion magnetically coupled to the first portion to produce a rotational motion, and a mechanical output system coupled to the rotational motion of the transfer system.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a generator system receiving the rotational output of the torque converter system and producing a plurality of electrical outputs coupled to a plurality of output control systems, a plurality of motor drives, each coupled to an output of at least one of the output control systems, and a plurality of output systems, each coupled to at least one of the motor drives.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a plurality of transfer systems, each coupled to one of the plurality of rotational outputs, and a plurality of generator systems, each coupled to one of the transfer systems.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system having a first portion coupled to the rotational output of the torque converter system and a second portion magnetically coupled to the first portion, a fluid conduit disposed between the first and second portions of the transfer system, the second portion of the transfer system disposed within the fluid conduit, and a fluid driver coupled to the second portion of the transfer system within the fluid conduit.

In another aspect, a power generating system includes a torque converter system receiving a rotational motion having a first torque and producing a rotational output having a second torque, a transfer system having a first portion coupled to the rotational output of the torque converter system and a second portion magnetically coupled to the first portion, a fluid conduit disposed between the first and second portions of the transfer system, the second portion of the transfer system disposed within the fluid conduit, and a fluid driver coupled to the second portion of the transfer system within the fluid conduit.

In another aspect, a power generating system includes a torque converter system receiving a rotational motion having a first torque and producing a first rotational output having a second torque, a transfer system including first and second portions magnetically coupled to each other, the first portion connected to the rotational output of the torque converter system and the second portion producing a second rotational output, a generator system having an input connected the second rotational output and an electrical output, and a controller connected to the electric output and producing a first output connected to a first bank and a second output connected to a second bank, wherein the first bank produces first operations and recharge voltages and the second bank produces second operational and recharge voltages.

In another aspect, a power generating system includes a generator drive system receiving voltage input to produce a first rotational output, a transfer system having a first portion connected to the first rotational output and a second portion producing a second rotational output having a first torque, a torque converter system receiving the second rotational output and producing a third rotational output having a second torque, and an aircraft system coupled to the third rotational output.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system having a first portion coupled to the rotational output of the torque converter system and a second portion magnetically coupled to the first portion, a fluid conduit disposed between the first and second portions of the transfer system, the second portion of the transfer system disposed within the fluid conduit, and a fluid driver coupled to the second portion of the transfer system within the fluid conduit.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system including first and second portions magnetically coupled to each other, the first portion connected to the rotational output of the torque converter system and the second portion producing a second rotational output, a generator system having an input connected the second rotational output and an electrical output, and a controller connected to the electric output and producing a first output connected to a first bank and a second output connected to a second bank, wherein the first bank produces first operations and recharge voltages and the second bank produces second operational and recharge voltages.

In another aspect, a power generating system includes a torque converter system receiving a rotational motion having a first torque from a source and producing a rotational output having a second torque, the torque converter comprises a flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system including first and second portions magnetically coupled to each other, the first portion connected to the rotational output of the torque converter system and the second portion producing a second rotational output, a generator system having an input connected the second rotational output and an electrical output, and a controller connected to the electric output and producing a first output connected to a first bank and a second output connected to a second bank, wherein the first bank produces first operations and recharge voltages and the second bank produces second operational and recharge voltages.

In another aspect, a power generating system includes a generator drive system receiving voltage input to produce a first rotational output, a transfer system having a first portion connected to the first rotational output and a second portion producing a second rotational output having a first torque, a torque converter system receiving the second rotational output and a producing a third rotational output having a second torque, the torque converter comprises a flywheel rotatable about a first axis receiving the second rotational output, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis for producing the third rotational output, the generator disk including a second body portion, and a third plurality of magnets within the second body portion magnetically coupled to the first and second pluralities of permanent magnets, the generator disk coupled to produce the rotational output having the second torque, and an aircraft system coupled to the third rotational output.

In another aspect, a power generating system includes a torque converter system receiving a rotational motion having a first torque from a source and producing a rotational output having a second torque, the torque converter comprises a flywheel rotatable about a first axis, the flywheel including a first body portion having a first radius from a circumferential surface and a first radius of curvature, a first plurality of magnets mounted in the first body portion, each end of the first plurality of magnets having first ends disposed from the circumferential surface of the first body portion, and each of the first ends having a second radius of curvature similar to the first radius of curvature, and a second plurality of magnets mounted in the first body portion, each of the second plurality of magnets being located between a corresponding adjacent pair of the first plurality of magnets, the flywheel receiving the rotational motion having the first torque, and a generator disk rotatable about a second axis angularly offset with respect to the first axis, the generator disk including a second body portion, and a third plurality of magnets within the second body portion magnetically coupled to the first and second pluralities of permanent magnets, the generator disk coupled to produce the rotational output having the second torque, a transfer system having a first portion coupled to the rotational output of the torque converter system and a second portion magnetically coupled to the first portion, and a generator system coupled to the transfer system to produce and electrical output, the generator including a rotor having an even number of magnetic sources and a first pair of stators, each stator having a first set of odd-number of coil members and each stator disposed adjacent to opposing side portions of the rotor.

In another aspect, a multiple power generating system includes a torque converter system receiving a rotational motion having a first torque from a source and producing a plurality of rotational outputs each having a second torque, the torque converter includes a plurality of flywheels each rotatable about a first axis, each of the flywheels include a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, and each of the flywheels receiving the rotational input having the first torque, and a plurality of generator disks each rotatable about a second axis, each of the generator disks include a second body portion, and a third plurality of magnets within the second body portion magnetically coupled to the first and second pluralities of permanent magnets upon rotation of at least one the flywheels and at least one of the generator disks, and each of the generator disks coupled to produce the rotational output having the second torque.

In another aspect, a multiple power generating system includes a torque converter system receiving a rotational motion having a first torque from a source and producing a plurality of rotational outputs each having a second torque, the torque converter includes at least one flywheel rotatable about a first axis, the flywheel including a first body portion, a first plurality of magnets mounted in the first body portion, each of the first plurality of magnets extending along a corresponding radial axial direction with respect to the first axis, and a second plurality of magnets mounted in the first body portion, each of the second plurality of magnets being located between a corresponding adjacent pair of the first plurality of magnets, and the flywheel receiving the rotational input having the first torque, and a plurality of generator disks each rotatable about a second axis, each of the generator disks include a second body portion, and a third plurality of magnets within the second body portion magnetically coupled to the first and second pluralities of permanent magnets upon rotation of the at least one the flywheel and at least one of the generator disks, and each of the generator disks coupled to produce the rotational output having the second torque.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiments of the present invention, examples of which are illustrated in the accompanying drawings.

Figure 1:
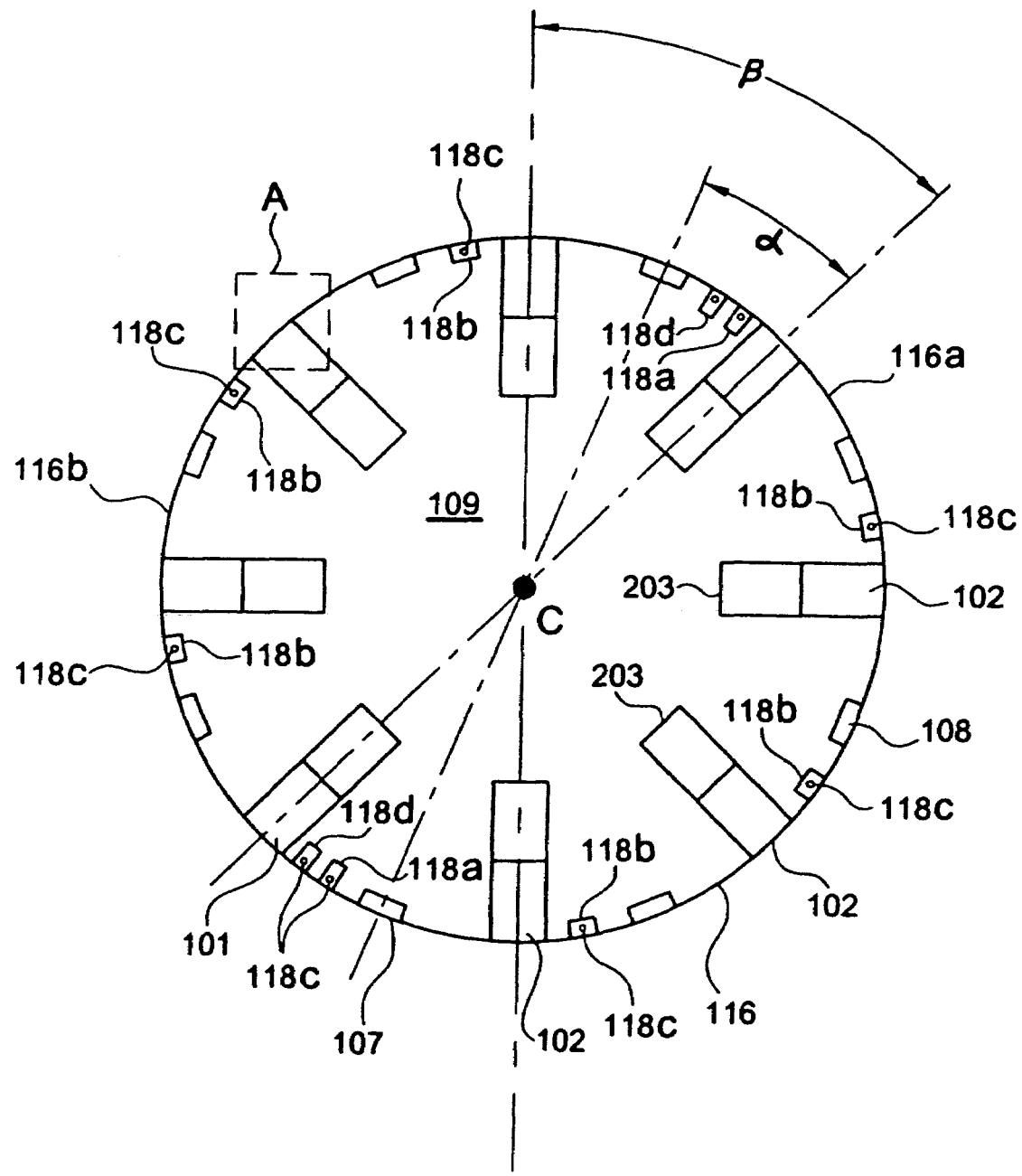
FIG. 1 is a layout diagram of an exemplary flywheel according to the present invention.

FIG. 1 is a layout diagram of an exemplary flywheel according to the present invention. In FIG. 1, a flywheel 109 may be formed from a cylindrical core of composite material (s), such as nylon, and may be banded along a circumferential edge of the flywheel by a non-magnetic retaining ring 116, such as non-magnetic stainless steel or phenolic materials. The flywheel 109 may include a plurality of magnets 102 disposed within a plurality of equally spaced first radial grooves 101 of the flywheel 109, wherein each of the magnets 102 may generate relatively strong magnetic fields. In addition, each of the magnets 102 may have cylindrical shapes and may be backed by a backing plate 203, such as soft iron or steel, disposed within each of the plurality of first radial grooves 101 in order to extend the polar fields of the magnets 102 closer to a center C of the flywheel 109.

Figure 3:
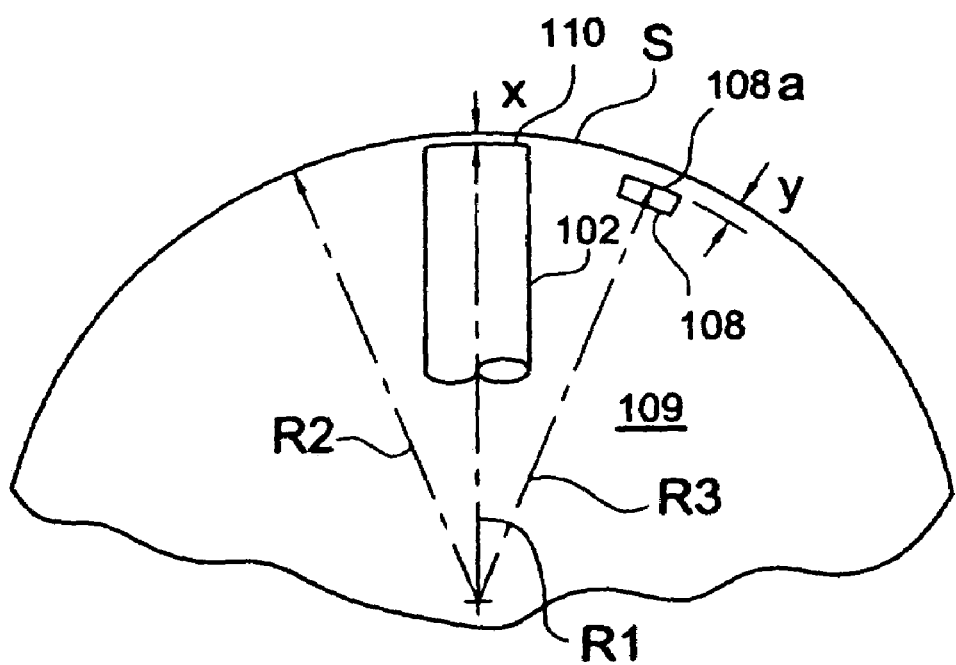
FIG. 3 is an enlarged view of region A of FIG. 1 showing an exemplary placement of driver magnets within a flywheel according to the present invention.

In FIG. 1, the flywheel 109 may also include a plurality of suppressor magnets 108 disposed within a plurality of second radial grooves 107 along a circumferential face of the flywheel 109. Accordingly, as shown in FIG. 3, surfaces 110 of the magnets 102 may be spaced from a circumferential surface S of the flywheel 109 by a distance X, and surfaces of the suppressor magnets 108 may be recessed from the circumferential face S of the flywheel 109 by a distance Y.

In FIG. 1, each of the plurality of second radial grooves 107 may be disposed between each of the plurality of first grooves 101. For example, each one of eight suppressor magnets 108 may be disposed within each of eight grooves 107 and each one of eight magnets 102 may be disposed within each of eight grooves 101. Accordingly, an angular separation β between each of the first radial grooves 101 may be twice an angular separation a between adjacent first and second radial grooves 101 and 107. Of course, the total number of magnets 102 and 108 and the first and second grooves 101 and 107, respectively, may be changed. The suppressor magnets 108 in the eight grooves 107 and the magnets 102 in the eight grooves 101 of the flywheel 109 have their north magnetic fields facing toward the circumferential surface S (in FIG. 3) of the flywheel 109 and their south magnetic fields facing radial inward toward a center portion C of the flywheel 109. Alternatively, opposite polar arrangement may be possible such that the suppressor magnets 108 and the magnets 102 may have their south magnetic fields facing toward the circumferential surface S (in FIG. 3)

of the flywheel 109 and their north magnetic fields facing radial inward toward a center portion C of the flywheel 109.

Figure 6:
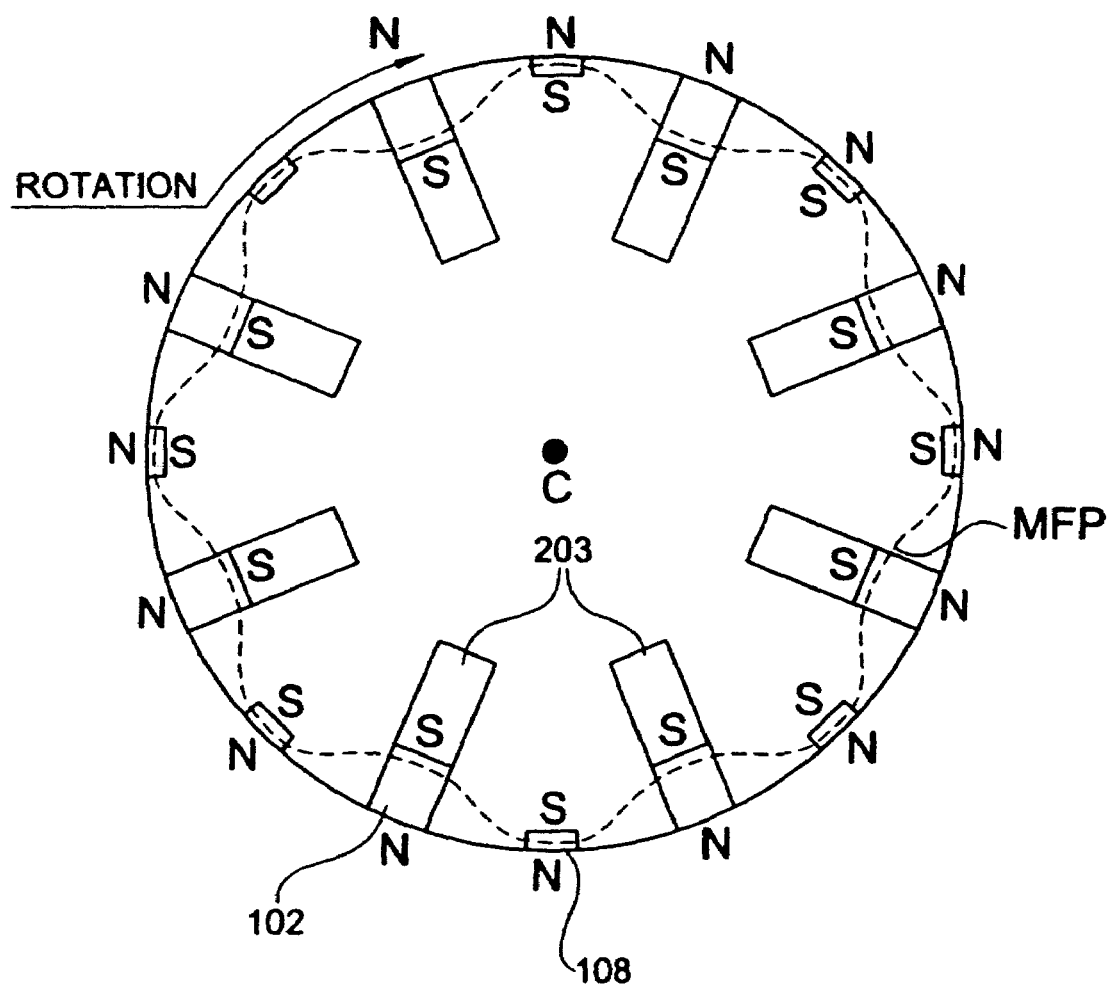
FIG. 6 is a schematic diagram of exemplary magnetic fields of the flywheel of FIG. 1 according to the present invention.

In FIG. 1, backing plates 203 may be disposed at end portions of the magnets disposed within the plurality of first grooves 101 at the south poles of the magnets 102 in order to form a magnetic field strength along a radial direction toward the circumferential surface S (in FIG. 3) of the flywheel 109. Although not specifically shown, each of the backing plates may be attached to the flywheel 109 using a fastening system, such as retaining pins and/or bolts, or may be retained within the flywheel 109 due to the specific geometry of the magnets 102 within the first grooves 101. Accordingly, interactions of the magnetic fields of the magnets 102 within the plurality of first grooves 101 and the suppressor magnets 108 disposed within the plurality of second grooves 107 create a magnetic field pattern (MFP), as shown in FIG. 6, of repeating arcuate shapes, i.e., sinusoidal curve, around the circumferential surface S (in FIG. 3) of the flywheel 109.

In FIG. 1, the flywheel 109 may be formed of plastic material(s), such as PVC and Plexiglas. In addition, the flywheel may be formed of molded plastic material(s), and may be formed as single structure. The material or materials used to form the flywheel 109 may include homogeneous materials in order to ensure a uniformly balanced system. In addition to the circular geometry shown in FIG. 1, other geometries may be used for the flywheel 109. For example, polygonal and triangular geometries may be used for the flywheel 109. Accordingly, the number of magnets 102 and the suppressor magnets 108 and placement of the magnets 102 and the suppressor magnets 108 may be adjusted to provide magnetic coupling to a corresponding generator disk 111 (in FIG. 4)

In FIG. 1, the total number and sizes of the magnets 102 and the suppressor magnets 108 may be adjusted according to an overall diameter of the flywheel 109. For example, as the diameter of the flywheel 109 increases, the total number of magnets 102 and the suppressor magnets 108 may increase. Conversely, as the diameter of the flywheel 109 decreases, the total number of magnets 102 and the suppressor magnets 108 may decrease. Furthermore, as the diameter of the flywheel 109 increases or decreases, the total number of magnets 102 and the suppressor magnets 108 may increase or decrease, respectively. Alternatively, as the diameter of the flywheel 109 increases or decreases, the total number of magnets 102 and the suppressor magnets 108 may decrease or increase, respectively.

Figure 2:
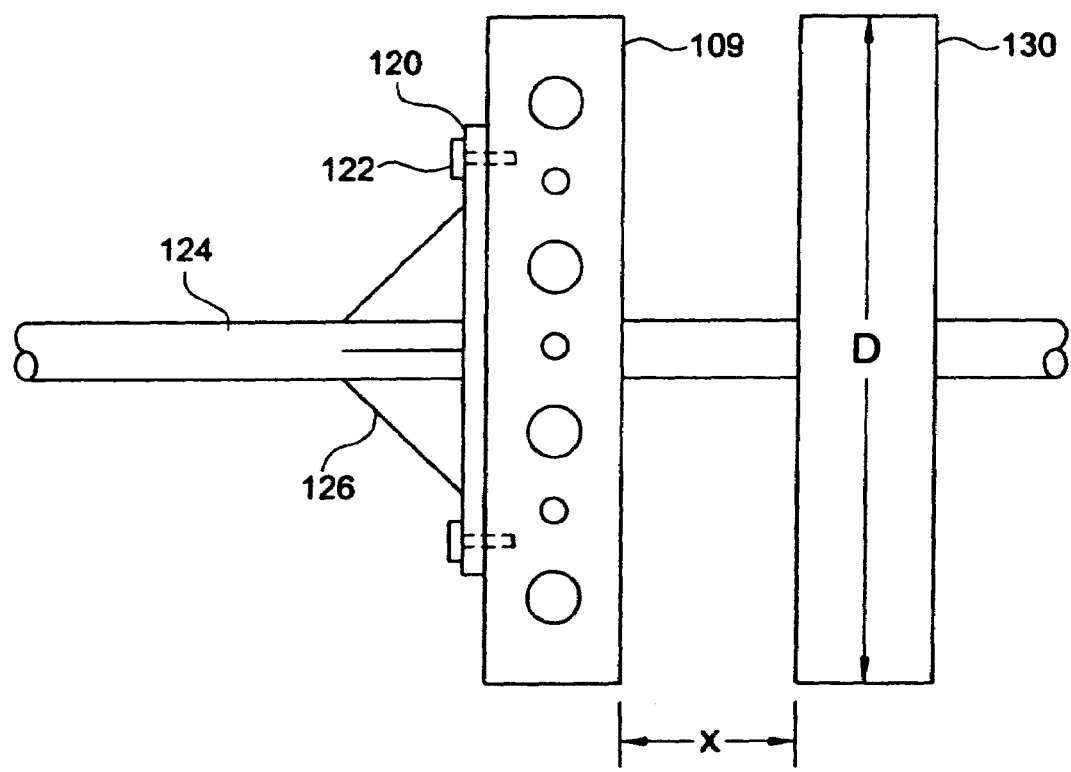
FIG. 2 is a side view of an exemplary attachment structure of the flywheel according to the present invention.

FIG. 2 is a side view of an exemplary attachment structure of the flywheel according to the present invention. In FIG. 2, the flywheel 109 includes a fastening system having plurality of spaced fastening members 122 that may be used to attach a major face of the flywheel 109 to a shaft backing plate 120. Accordingly, a shaft 124 may be fastened to the shaft backing plate 120 using a plurality of support members 126. In FIG. 2, the shaft backing plate 120 may be formed having a circular shape having a diameter less than or equal to a diameter of the flywheel 109. In addition, the shaft 124 may extend through the flywheel 109 and may be coupled to an expanding flywheel 130. The expanding flywheel 130 may be spaced from the flywheel 109 by a distance X in order to prevent any deteriorating magnetic interference with the magnets 102 and suppressor magnets 108 within the flywheel 109. The expanding flywheel 130 may include structures (not shown) that would increase an overall diameter D of the expanding flywheel 130 in order to increase the angular inertia of the flywheel 109. Moreover, the shaft 124 may extend through the expanding flywheel 130 to be supported by a support structure (not shown).

As shown in FIG. 1, the first and second retaining ring portions 116a and 116b may cover the entire circumferential surface S (in FIG. 3) of the flywheel 109. Accordingly, the outermost attachment tabs 118a of the first retaining ring portion 116a and the outermost attachment tabs 118d of the second retaining ring portion 116b may be fastened to the flywheel 109 at adjacent locations to each other. In addition, although each of the first and second retaining ring portions 116a and 116b are shown having three innermost attachment tabs 118b, different pluralities of the innermost attachment tabs 118b may be used according to the size of the flywheel 109, the number of magnets 102 and 108, and other physical features of the flywheel 109 components within the flywheel 109.

Although not shown in FIG. 1, a reinforced tape may be provided along an outer circumference of the retaining ring 116. Accordingly, the reinforced tape may protect the retaining ring 116 from abrasion.

FIG. 3 is an enlarged view of region A of FIG. 1 showing an exemplary placement of driver magnets within a flywheel according to the present invention. In FIG. 3, the surface 110 of the magnet 102 may have a radius of curvature R1 similar to the radius R2 of the flywheel 109. For example, R1 may be equal to R2, or R1 may be approximately equal to R2. In addition, the surface 108a of the suppressor magnet 108 may have a radius of curvature R3 similar to the radiuses R1 and R2. However, the surface 108a of the suppressor magnet 108 may simply have a flat shape.

Figure 4:
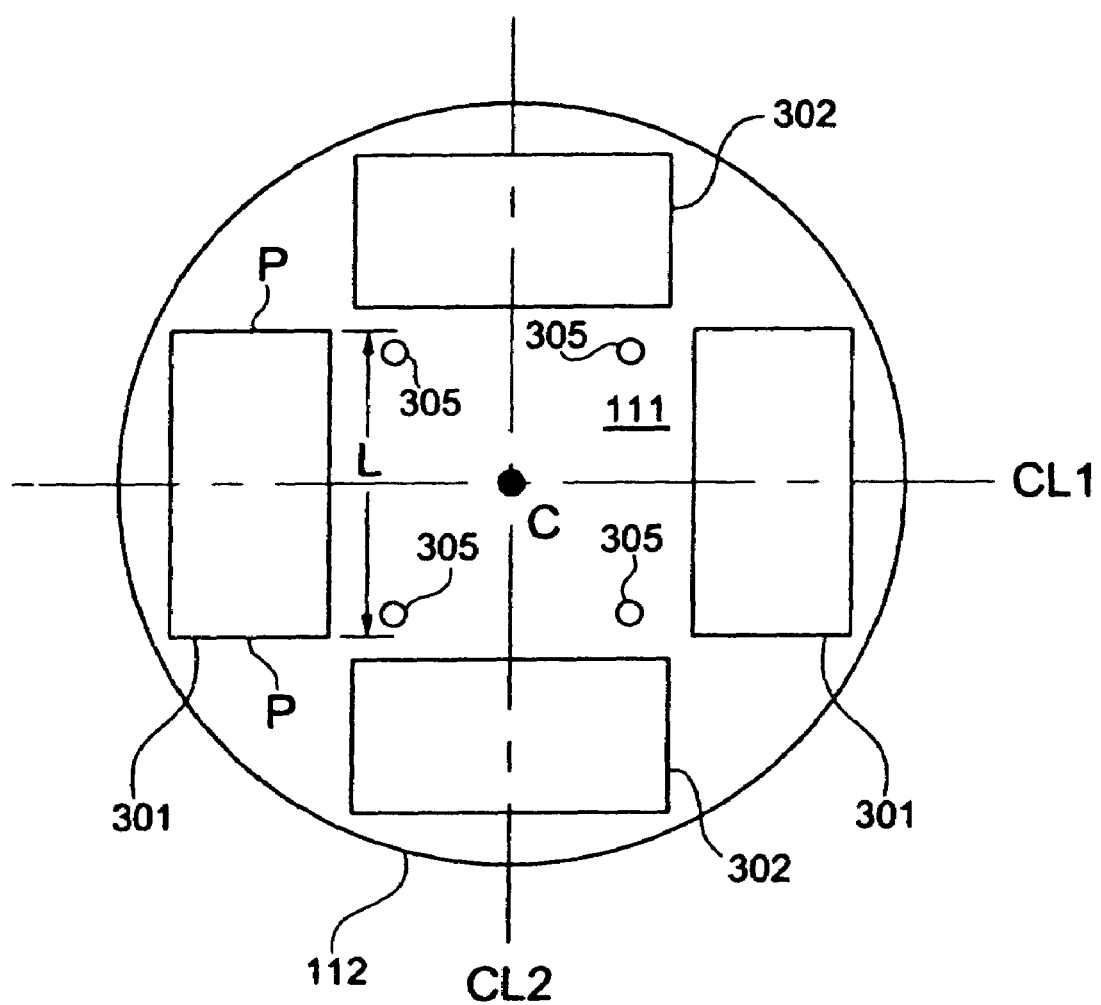
FIG. 4 is a layout diagram of an exemplary generator disk according to the present invention.

FIG. 4 is a layout diagram of an exemplary generator disk according to the present invention. In FIG. 4, a generator disk 111, preferably made from a nylon or composite nylon disk, may include two rectangular magnets 301 opposing each other along a first common center line CL1 through a center portion C of the generator disk 111, wherein each of the rectangular magnets 301 may be disposed along a circumferential portion of the generator disk 111. In addition, additional rectangular magnets 302 may be provided between the two rectangular magnets 301, and may be opposing each other along a second common center line CL2 through a center portion C of the generator disk 111 that is perpendicular to the first common center line CL1. Alternatively, the additional rectangular magnets 302 may be replaced with non-magnetic weighted masses in order to prevent an unbalanced generator disk 111.

In FIG. 4, each of the two rectangular magnets 301, as well as each of the additional rectangular magnets 302 or the non-magnetic weighted masses, may have a first length L extending along a direction perpendicular to the first and second common center lines CL1 and CL2, wherein a thickness of the two rectangular magnets 301, as well as each of the additional rectangular magnets 302 or the non-magnetic weighted masses, may be less than the first length L. In addition, each of the two rectangular magnets 301, as well as each of the additional rectangular magnets 302, may have a relatively large magnetic strength, wherein surfaces of the two rectangular magnets 301, as well as each of the additional rectangular magnets 302, parallel to a major surface of the generator disk 111 may be one of south and north poles. Moreover, either an even-number or odd-number of magnets 301 may be used, and interval spacings between the magnets 301 may be adjusted to attain a desired magnetic configuration of the generator disk 11.

Figure 5:
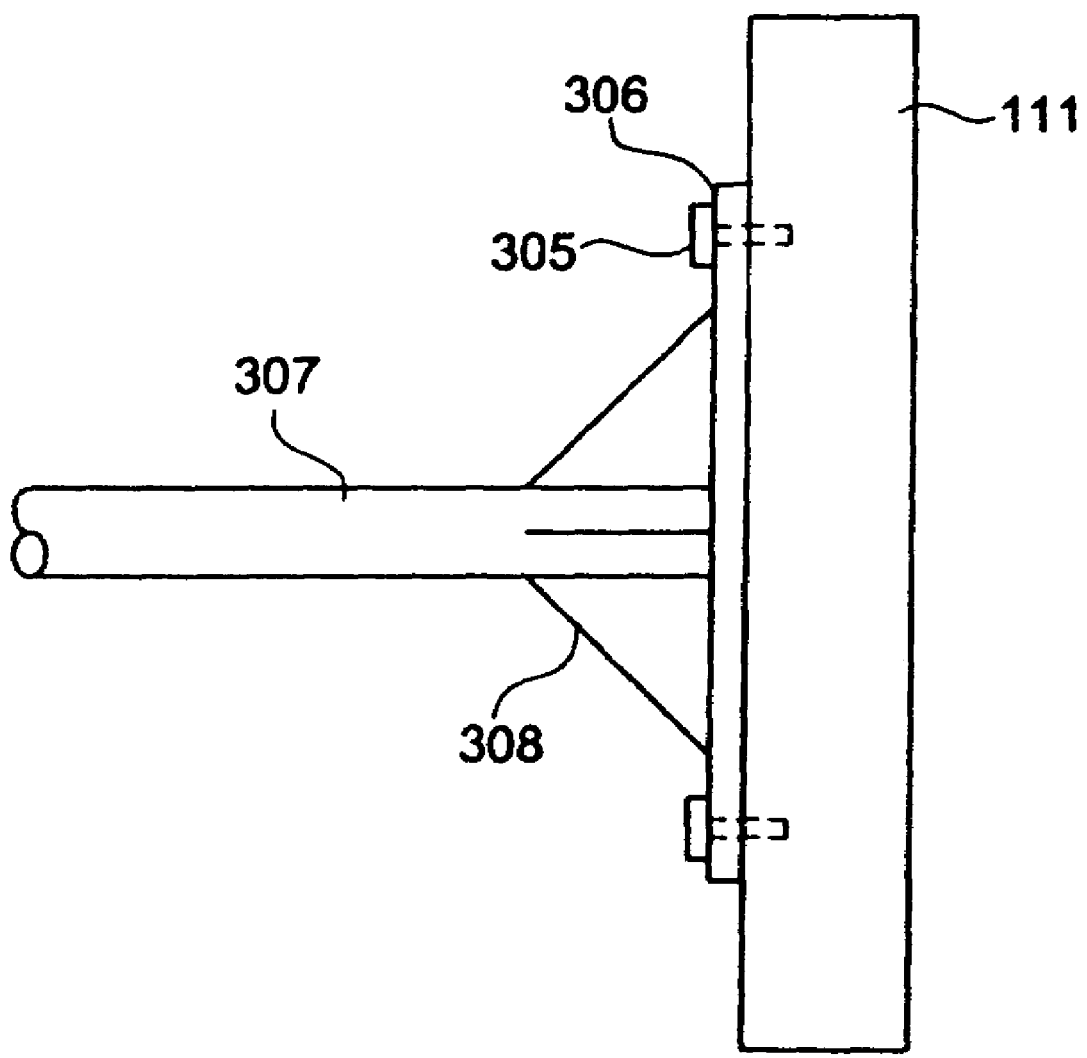
FIG. 5 is a side view of an exemplary shaft attachment to a generator disk according to the present invention.

FIG. 5 is a side view of an exemplary shaft attachment to a generator disk according to the present invention. In FIGS. 4 and 5, the generator disk 111 includes a plurality of spaced fastening members 305 that may be used to attach the generator disk 111 to a shaft backing plate 306. Accordingly, a shaft 307 may be fastened to the shaft backing plate 306 using a plurality of support members 308. In FIG. 5, the shaft backing plate 306 may be formed having a circular shape having a diameter less than or equal to a diameter of the generator disk 11.

In FIGS. 4 and 5, the generator disk 111 may be formed of the same, or different materials from the materials used to form the flywheel 109 (in FIG. 1). Moreover, the geometry of the generator disk 111 may be circular, as shown in FIG. 4, or may be different, such as polygonal and triangular shapes. In addition, the total number of the magnets 301, as well as each of the additional rectangular magnets 302 or the non-magnetic weighted masses, may be adjusted according to an overall diameter of the flywheel 109 and/or the generator disk 111. For example, as the diameter of the flywheel 109 and/or the generator disk 111 increases, the total number and size of the magnets 301, as well as each of the additional rectangular magnets 302 or the non-magnetic weighted masses, may increase. Conversely, as the diameter of the flywheel 109 and/or generator disk 111 decreases, the total number and size of the magnets 301, as well as each of the additional rectangular magnets 302 or the non-magnetic weighted masses, may decrease. Furthermore, as the diameter of the flywheel 109 and/or the generator disk 111 increases or decreases, the total number and size of the magnets 301, as well as each of the additional rectangular magnets 302 or the non-magnetic weighted masses, may increase or decrease, respectively. Alternatively, as the diameter of the flywheel 109 and/or the generator disk 111 increases or decreases, the total number and size of the magnets 301, as well as each of the additional rectangular magnets 302 or the non-magnetic weighted masses, may decrease or increase, respectively.

FIG. 6 is a schematic diagram of exemplary magnetic fields of the flywheel of FIG. 1 according to the present invention. In FIG. 6, interactions of the magnetic fields of the magnets 102 and the suppressor magnets 108 create a magnetic field pattern (MFP) of repeating arcuate shapes, i.e., sinusoidal curve, around the circumferential surface S of the flywheel 109. Accordingly, the backing plates 203 and the suppressor magnets 108 provide for displacement of the south fields of the magnets 102 toward the center C of the flywheel 109.

Figure 7:
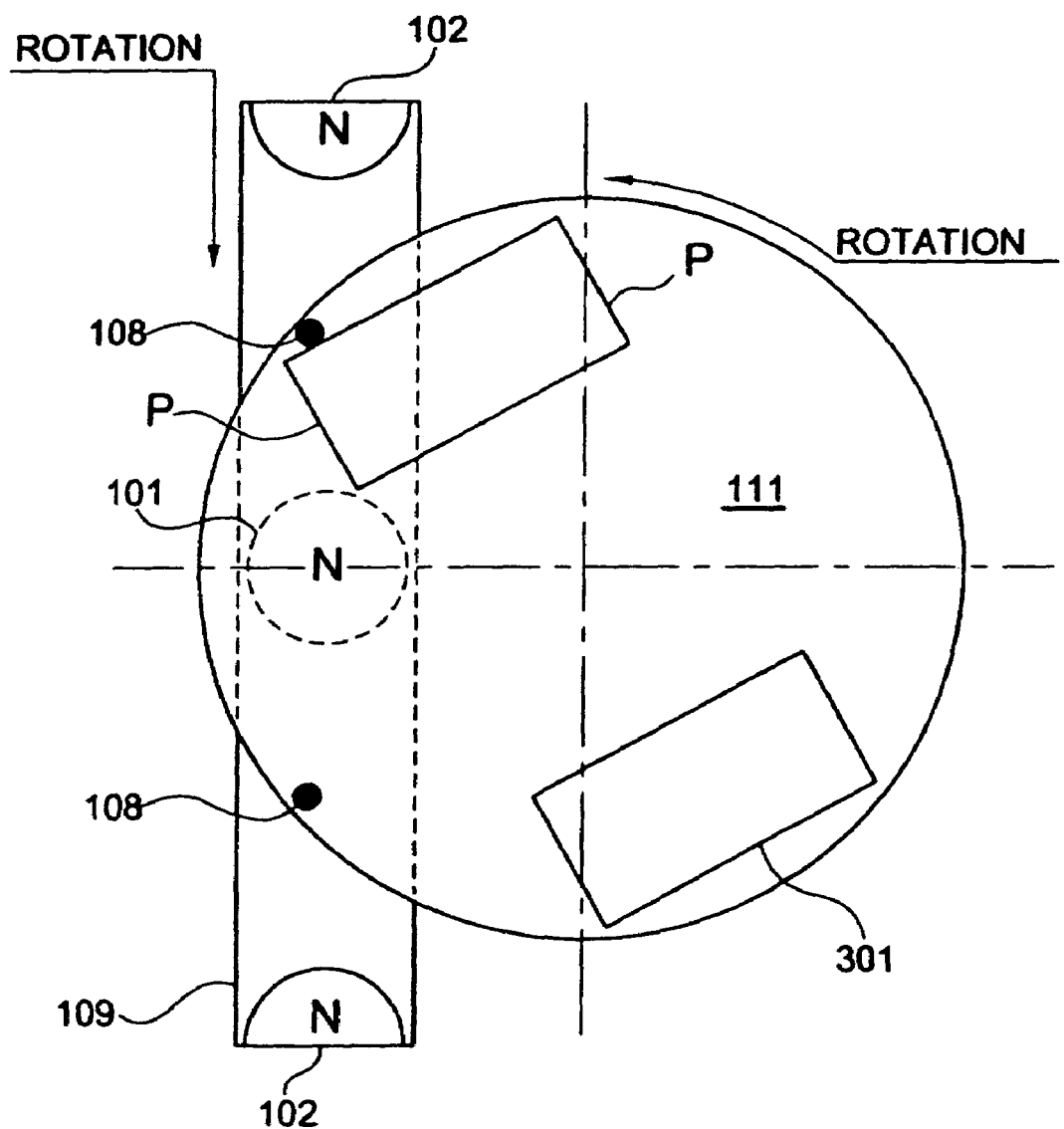
FIG. 7 is a schematic diagram of an exemplary initial magnetic compression process of the torque converter according to the present invention.
Figure 8:
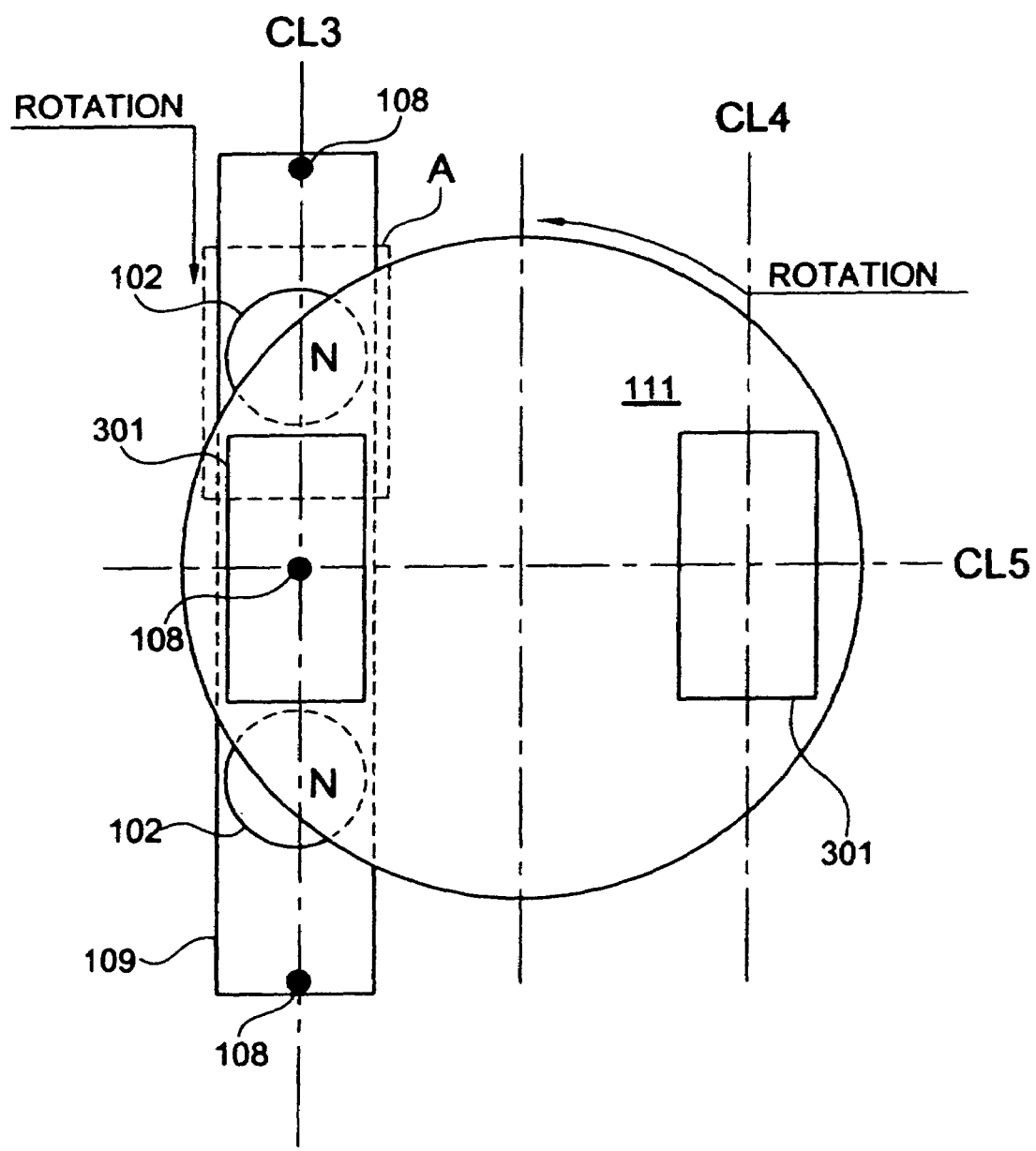
FIG. 8 is a schematic diagram of an exemplary magnetic compression process of the torque converter according to the present invention.
Figure 11:
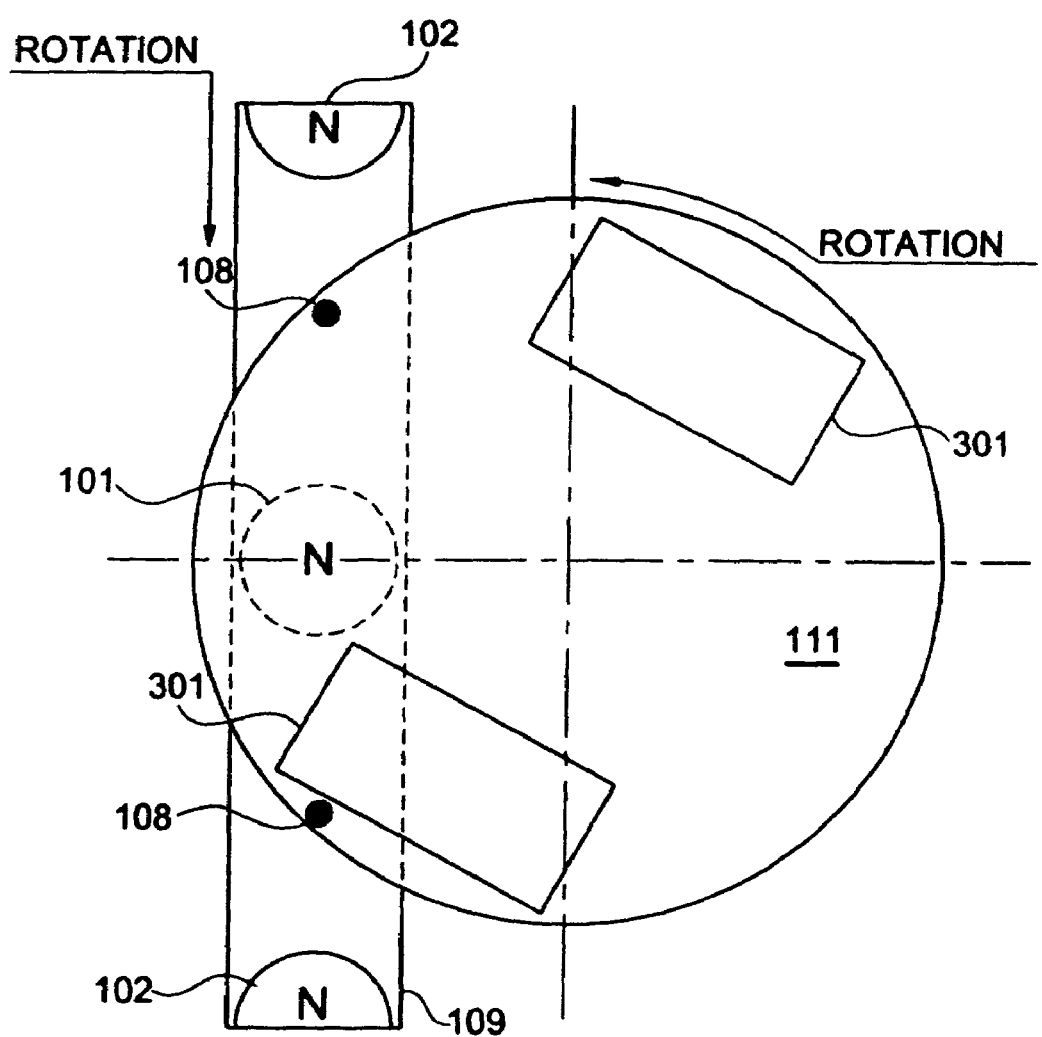
FIG. 11 is a schematic diagram of an exemplary magnetic decompression process of the torque converter according to the present invention.

FIG. 7 is a schematic diagram of an exemplary initial magnetic compression process of the torque converter according to the present invention, FIG. 8 is another schematic diagram of an exemplary magnetic compression process of the torque converter according to the present invention, and FIG. 11 is a schematic diagram of an exemplary magnetic decompression process of the torque converter according to the present invention. In each of FIGS. 7, 8, and 11, the schematic view is seen from a rear of the generator disk, i.e., the surface opposite to the surface of the generator disk 111 having the two rectangular magnets 301, and the flywheel 109 is located behind the generator disk 111. In addition, the flywheel 109 is rotating in a downward clockwise direction, as indicated, and the generator disk 111 is rotating along a counterclockwise direction. The generator disk 111 may be spaced from the flywheel 109 by a small air gap, such as within a range of about three-eighths of an inch to about 0.050 inches. The small air gap may be determined by specific application. For example, systems requiring a larger configuration of the flywheel and generator disk may require adjustment of the air gaps. Similarly, systems requiring more powerful or less powerful magnets may require air gaps having a specific range of air gaps. Moreover, for purposes of explanation the magnets 102 will now simply be referred to as driver magnets 102.

In FIG. 7, one of the two rectangular magnets 301 disposed on the generator disk 111 begins to enter one of the spaces within a magnetic field pattern (MFP) of the flywheel 109 between two north poles generated by the driver magnets 102. The driver magnets 102 may be disposed along a circumferential center line of the flywheel 109, or may be disposed along the circumference of the flywheel 109 in an offset configuration. The midpoint between adjacent driver magnets 102 in the flywheel 109 is a position in which the MFP where the south pole field is the closest to the circumferential surface S (in FIG. 6) of the flywheel 109.

In FIG. 7, as the flywheel 109 rotates along the downward direction, the north pole of one of the two rectangular magnets 301 on the generator disk 111 facing the circumferential surface S (in FIG. 6) of the flywheel 109 enters adjacent north magnetic field lines of the driver magnets 102 along a shear plane of the two rectangular magnets 301 and the driver magnets 102. Accordingly, the shear force required to position one of the two rectangular magnets 301 between the adjacent driver magnets 102 is less than the force required to directly compress the north magnetic field lines of the two rectangular magnets 301 between adjacent driver magnets 102. Thus, the energy necessary to position one of the two rectangular magnets 301 between adjacent ones of the driver magnets 102 is reduced.

In addition, the specific geometrical interface between the driver and rectangular magnets 102 and 301 provides for a relatively stable repulsive magnetic field. For example, the cylindrical surface of the adjacent driver magnets 102 generate specific magnetic fields from the curved surfaces 110. In addition, the planar surfaces P of the rectangular magnet 301 entering the adjacent magnetic fields of the adjacent driver magnets 102 generate another specific magnetic field. Accordingly, the interaction of the magnetic fields of the driver and rectangular magnets 102 and 301, and more specifically, the manner in which the magnetic fields of the driver and rectangular magnets 102 and 301 are brought into interaction, i.e., along a magnetic shear plane, create a relatively stable repulsive magnetic field.

In addition, although the suppressor magnet 108 also provides a repelling force to the driver magnet 102, the force of repulsion of the suppressor magnet 108 is preferably relatively less than the repulsive force of the rectangular magnet 301. However, as will be explained with regard to FIG. 8, the suppressor magnet 108 provides an additional repulsion force when the magnetic fields of the driver and rectangular magnets 102 and 301 are decompressed.

Figure 12:
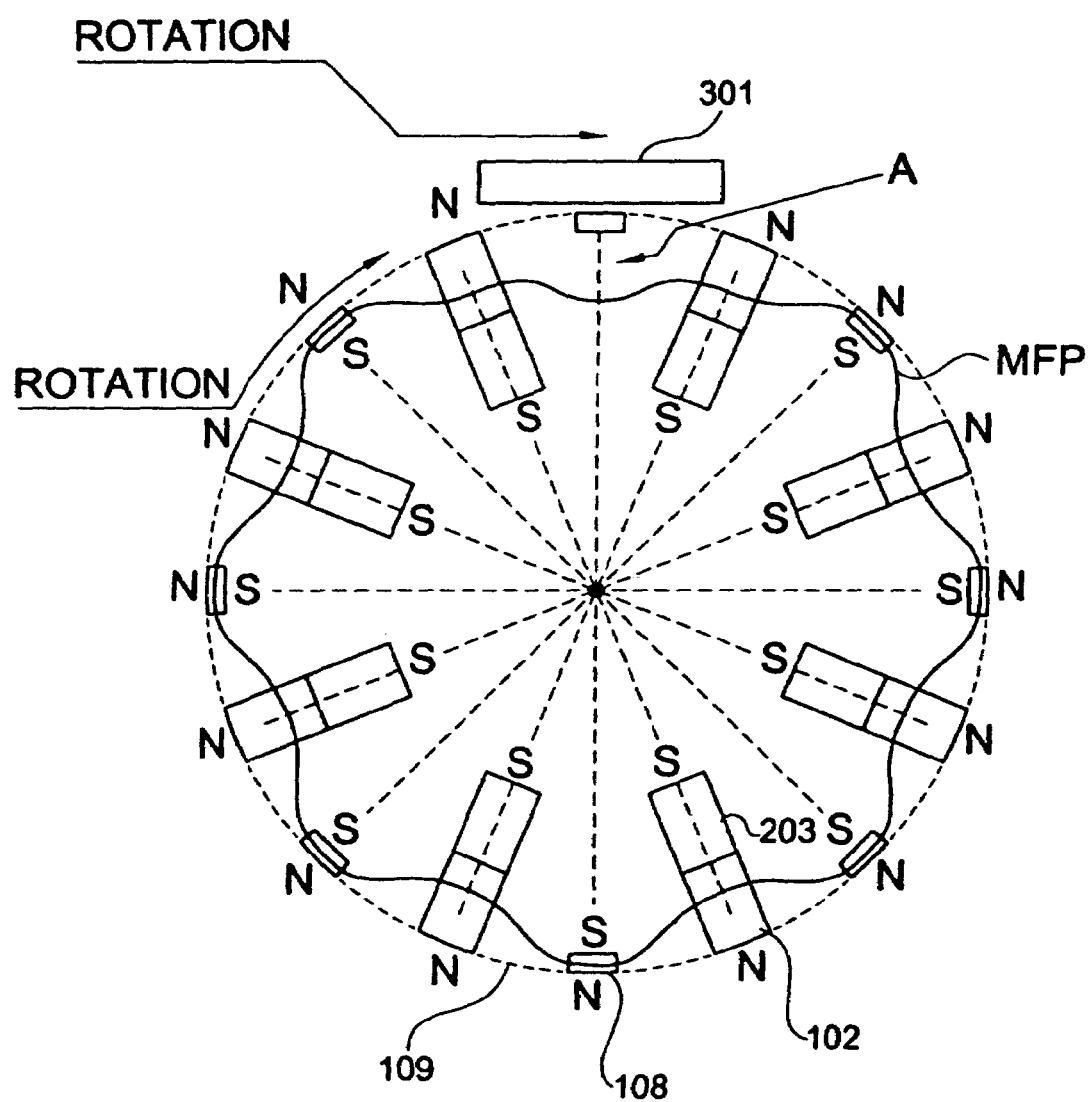
FIG. 12 is a schematic diagram of an exemplary magnetic force pattern of the flywheel of FIG. 1 during a magnetic compression process of FIG. 8 according to the present invention.

In FIG. 8, once the rectangular magnet 301 on the generator disk 111 fully occupies the gap directly between the north poles of two adjacent driver magnets 102 of the flywheel 109, the weaker north pole (as compared to the north poles of the driver and rectangular magnets 102 and 301) of the suppressor magnet 108 on the flywheel 109 is repelled by the presence of the north pole of the rectangular magnet 301 on the generator disk I 11. Thus, both the north and south magnetic fields of the MFP below the outer circumference of the flywheel 109 are compressed, as shown at point A (in FIG. 12).

In FIG. 8, a centerline CL3 of the flywheel 109 is aligned with a centerline CL4 of the magnet 301 of the generator disk 11 during magnetic field compression of the driver magnets 102, the suppressor magnet 108, and the magnet 301 of the generator disk 301. Accordingly, placement of the rotation axis of the flywheel 109 and the rotation axis of the generator disk 1111 is preferably set such that the centerline CL3 of the flywheel 109 is aligned with the centerline CL4 of the magnet 301 of the generator disk 111.

Figure 9:
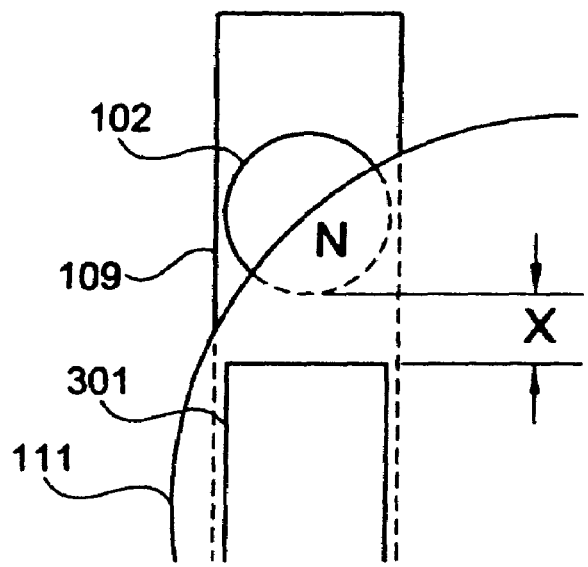
FIG. 9 is an enlarged view of region A of FIG. 8 according to the present invention.

FIG. 9 is an enlarged view of region A of FIG. 8 according to the present invention. In FIG. 9, a distance X between facing surfaces of the driver magnet 102 (and likewise the other driver magnet 102 adjacent to the opposing end of the magnet 301 of the generator disk 111) is set in order to provide specific magnetic field compression of the driver magnets 102 and the magnet 301 of the generator disk 111. Preferably, the distance X may be set to zero, but may be set to a value to ensure that no torque slip occurs between the flywheel 109 and the generator disk 111. The torque slip is directly related to the magnetic field compression strength of the driver magnets 102 and the magnet 301, as well as the magnetic strength and geometries of the driver magnets 102 and the magnet 301.

Figure 10:
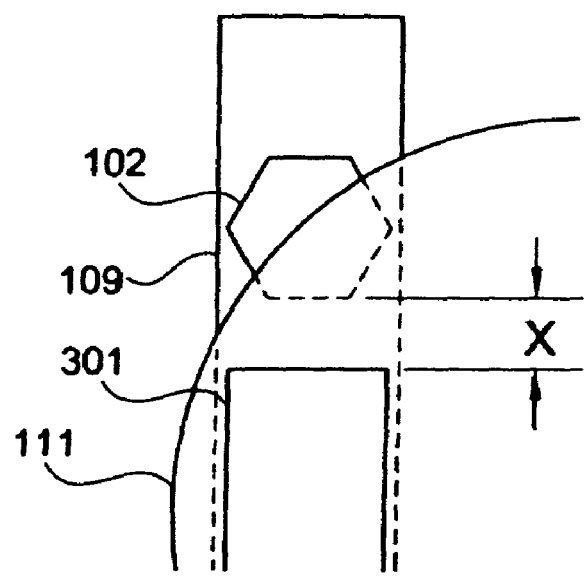
FIG. 10 is another enlarged view of region A of FIG. 9 according to the present invention.

FIG. 10 is another enlarged view of region A of FIG. 8 according to the present invention. In FIG. 10, the driver magnet 102 may have a cross-sectional geometry that includes a polygonal shape, wherein a side of the polygonal shaped driver magnet 102 may be parallel to a side of the magnet 301 of the generator disk 11. However, the distance X between facing surfaces of the driver magnet 102 (and likewise the other driver magnet 102 adjacent to the opposing end of the magnet 301 of the generator disk 111) is set in order to provide specific magnetic field compression of the driver magnets 102 and the magnet 301 of the generator disk 111. Preferably, the distance X may be set to zero, but may be set to a value to ensure that no torque slip occurs between the flywheel 109 and the generator disk 111.

In FIG. 11, as the rectangular magnet 301 on the generator disk 111 begins to rotate out of the compressed magnetic field position and away from the flywheel 109, the north pole of the rectangular magnet 301 is strongly pushed away by the repulsion force of the north pole of the trailing driver magnet 102 on the flywheel 109 and by the magnetic decompression (i.e., spring back) of the previously compressed north and south fields in the MFP along the circumferential surface S (in FIG. 3) of the flywheel 109. The spring back force (i.e., magnetic decompression force) of the north pole in the MFP provides added repulsion to the rectangular magnet 301 of the generator disk 111 as the rectangular magnet 301 moves away from the flywheel 109.

Next, another initial magnetic compression process is started, as shown in FIG. 7, and the cycle of magnetic compression and decompression repeats. Thus, rotational movement of the flywheel 109 and the generator disk 111 continues.

Figure 13:
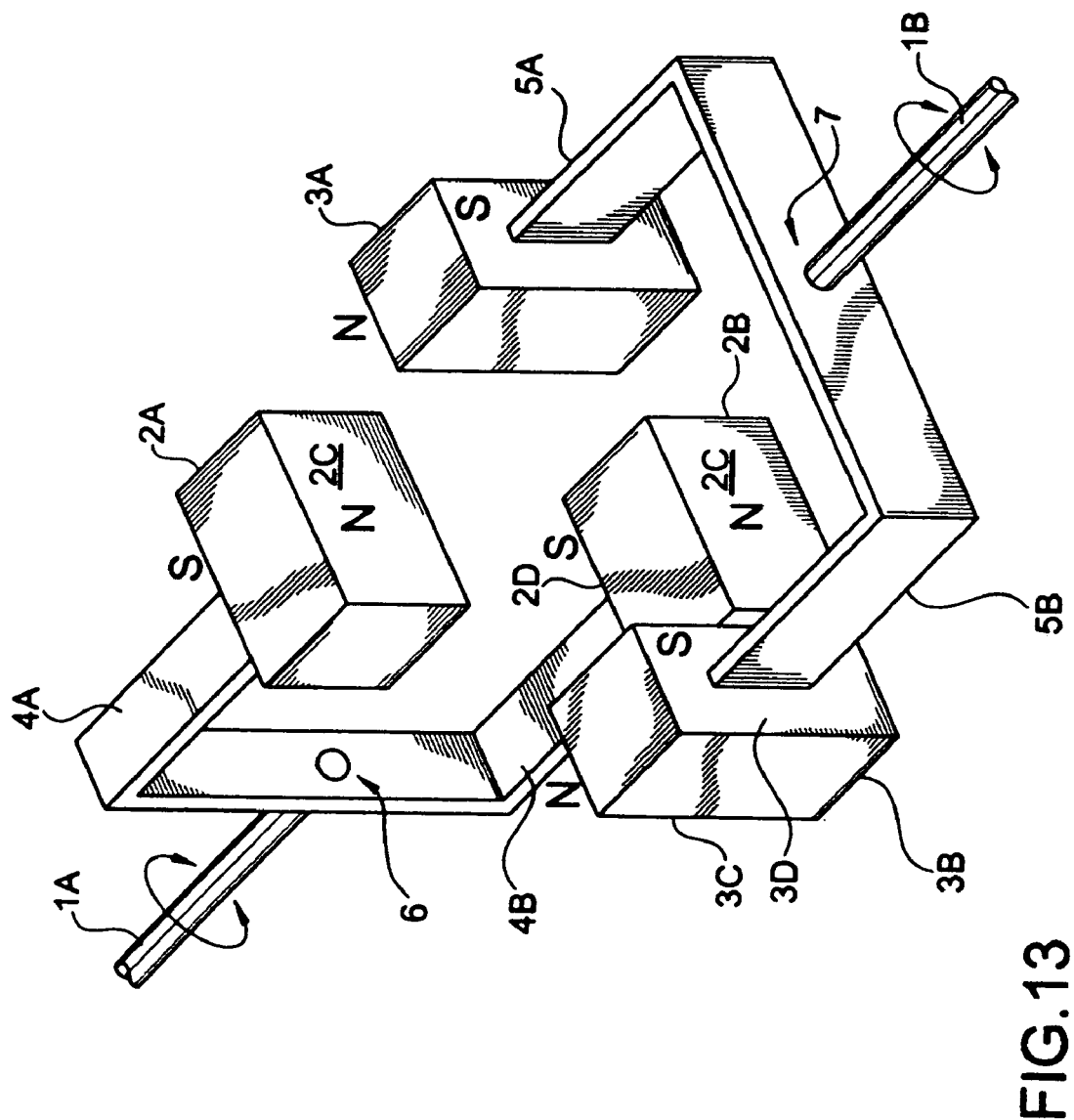
FIG. 13 is a perspective plan view of an exemplary torque transfer system according to the present invention.

FIG. 13 is a perspective plan view of an exemplary torque transfer system according to the present invention. In FIG. 13, a torque transfer system may include a first rotational shaft 1A and a second rotational shaft 1B. Both the first and second rotational shafts 1A and 1B may be coupled to other devices that may make use of the rotational motion and torque transmitted by the first and second rotational shafts 1A and 1B. In addition, the first rotational shaft 1A may be coupled to a first pair of magnetic members 2A and 2B via first coupling arms 4A and 4B, respectively, using a shaft coupling 6. Similarly, the second rotational shaft 1B may be coupled to a second pair of magnetic members 3A and 3B via second coupling arms 5A and 5B, respectively, using a shaft coupling 7. Accordingly, the first pair of magnetic members 2A and 2B may be aligned with each other along a first direction, and the second pair of magnetic members 3A and 3B may be aligned with each other along a second direction perpendicular to the first direction. The first and second coupling arms 4A/4B and 5A/5B may be made of non-magnetic material(s), thereby preventing any adverse reaction with the first and second magnetic members 2A/2B and 3A/3B. Of course, if the first and second rotational shafts 1A and 1B are made of non-magnetic material(s), then the first and second coupling arms 4A/4B and 5A/5B may not be necessary. Thus, the first and second magnetic members 2A/2B and 3A/3B may be configured to be coupled to the first and second rotational shafts 1A and 1B using a rotational disks, thereby providing improved rotational stabilization and improved precision.

In addition, the first and second magnetic members 2A/2B and 3A/3B may be configured to be movably coupled together. Accordingly, inducing rotational motion from one of the first magnetic members 2A/2B to another of the second magnetic members 3A/3B may gradually achieved by moving one of the first and second magnetic members 2A/2B and 3A/3B along a direction parallel to the first and second rotational shafts 1A and 1B. Thus, instantaneous transfers of rotational motion from/to the first and second rotational shafts 1A and 1B may be prevented.

In FIG. 13, the first pair of magnetic members 2A and 2B may have a polar orientation such that first faces 2C of the first pair of magnetic members 2A and 2B are magnetic North poles facing toward the second pair of magnetic members 3A and 3B, and second faces 2D of the first pair of magnetic members 2A and 2B face toward the first rotational shaft 1A. In addition, the second pair of magnetic members 3A and 3B may have a polar orientation such that first faces 3C of the second pair of magnetic members 3A and 3B North poles face toward the first pair of magnetic members 2A and 2B, and second faces 3D of the second pair of magnetic members 3A and 3B that face toward the second rotational shaft 1A. Accordingly, the opposing first faces 2C and 3C of the first and second magnetic members 2A/2B and 3A/3B, respectively, may have like polar orientation. Although FIG. 13 shows that the opposing first faces 2C and 3C of the first and second magnetic members 2A/2B and 3A/3B, respectively, may have North magnetic polar orientations, the opposing first faces 2C and 3C of the first and second magnetic members 2A/2B and 3A/3B, respectively, may have South magnetic polar orientations.

Accordingly, as the first rotational shaft 1A rotates about a first axial direction, the second magnetic members 3A and 3B are repelled by the first magnetic members 2A and 2B, thereby rotating the second rotational shaft 1B about a second axial direction identical to the first axial direction. Conversely, as the rate of rotation of the first rotational shaft 1A is reduced or increased along the first axial direction, the rate of rotation of the second rotational shaft 1B is reduced or increased by a direct correlation. Thus, as rotational torque increases or decreases along the first rotational shaft 1A, a corresponding amount of rotational torque may increase or decrease along the second rotational shaft 1B.

However, if the amount of torque transmitted along the first rotational shaft 1A abruptly stops or abruptly increases, the magnetic repulsion between the first and second magnetic members 2A/2B and 3A/3B may be overcome. Accordingly, the first rotational shaft 1A may actually rotate at least one-half of a revolution with respect to rotation of the second rotational shaft 1B. Thus, the abrupt stoppage or increase of the torque transmitted along the first rotational shaft 1A may be accommodated by the first and second magnetic members 2A/2B and 3A/3B, thereby preventing damage to the second rotational shaft 1B. In other words, if the change of transmitted torque exceeds the magnetic repulsion of the first and second magnetic members 2A/2B and 3A/3B, then the second rotational shaft 1B may "slip" in order to accommodate the change in torque. As compared to the related art, no shearing device may be necessary in order to prevent damage to the second rotational shaft 1B by the abrupt stoppage or increase of the torque transmitted along the first rotational shaft 1A.

In addition, since no additional mechanical members are necessary to transmit the rotational motion, as well as rotational torque, from the first rotational shaft 1A to the second rotational shaft 1B, heat is not generated nor is any noise generated. Thus, according to the present invention, no heat signature is created nor is any traceable noise generated. Thus, the present invention is applicable to systems that require stealth operation.

According to the present invention, various types and configurations of magnetic members may be implemented to achieve the same transfer of rotational torque from one shaft to another shaft. For example, the geometric shape and size of the first and second magnetic members 2A/2B and 3A/3B may be changed in order to provide specific magnetic coupling of the first and second rotational shafts 1A and 1B. Thus, the geometric shape and size of the first and second magnetic members 2A/2B and 3A/3B may include curved magnets, circular magnets, or non-linear geometries. Moreover, each of the first magnetic members 2A and 2B may have a first geometry and size and each of the second magnetic members 3A and 3B may have a second geometry and size different from the first geometry and size.

Figure 14:
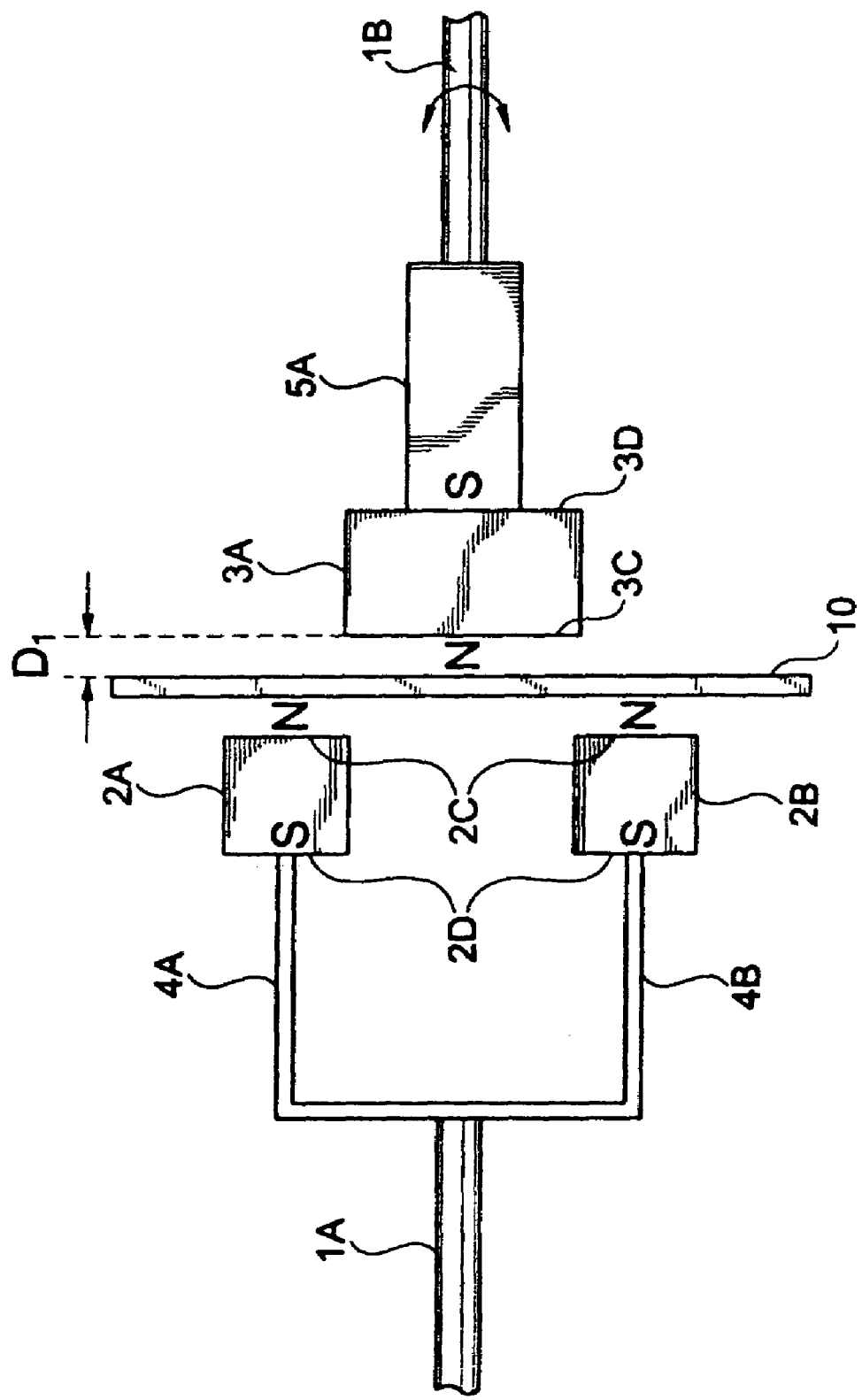
FIG. 14 is a side view of another exemplary torque transfer system according to the present invention.

FIG. 14 is a side view of another exemplary torque transfer system according to the present invention. In FIG. 14, each of the first and second magnetic members 2A/2B and 3A/3B may be disposed on either side of a barrier 10. Accordingly, the barrier 10 may be made from non-magnetic material(s), thereby preventing interference with the magnetic fields of the first and second magnetic members 2A/2B and 3A/3B. Moreover, each of the first and second magnetic members 2A/2B and 3A/3B may be spaced apart from the barrier 10 by a distance D1 along opposing side surfaces of the barrier 10. Accordingly, the distance D1 may be adjusted to provide specific magnetic field coupling strengths between the first and second magnetic members 2A/2B and 3A/3B. In addition, a thickness of the barrier may be adjusted to also provide specific magnetic field coupling strength between the first and second magnetic members 2A/2B and 3A/3B. Furthermore, the barrier 10 may comprise a composite of different materials that may provide specific magnetic field coupling strength between the first and second magnetic members 2A/2B and 3A/3B. In either event, the spacing D1 and/or the barrier 10, and barrier material(s), may be selected to provide specific magnetic field coupling strength between the first and second magnetic members 2A/2B and 3A/3B.

Figure 15:
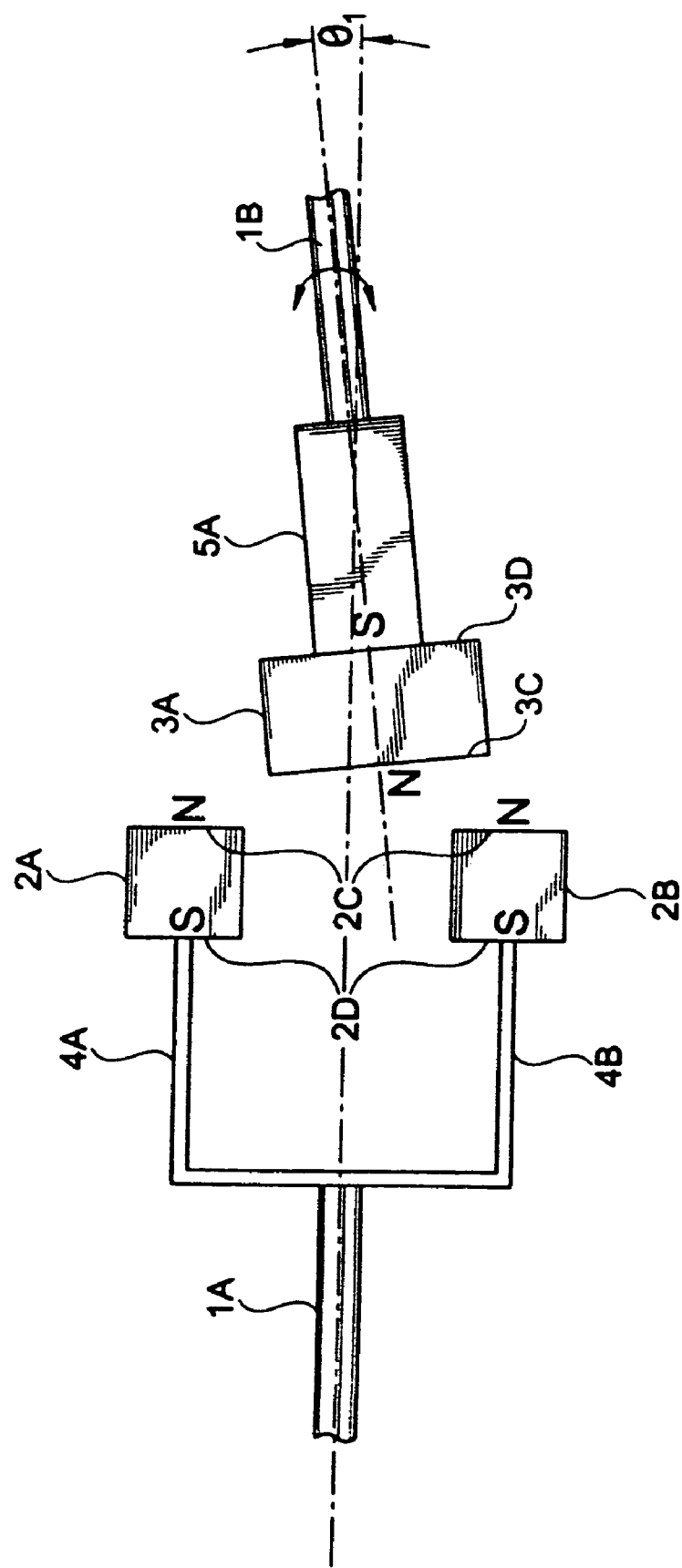
FIG. 15 is a side view of another exemplary torque transfer system according to the present invention.
Figure 16:
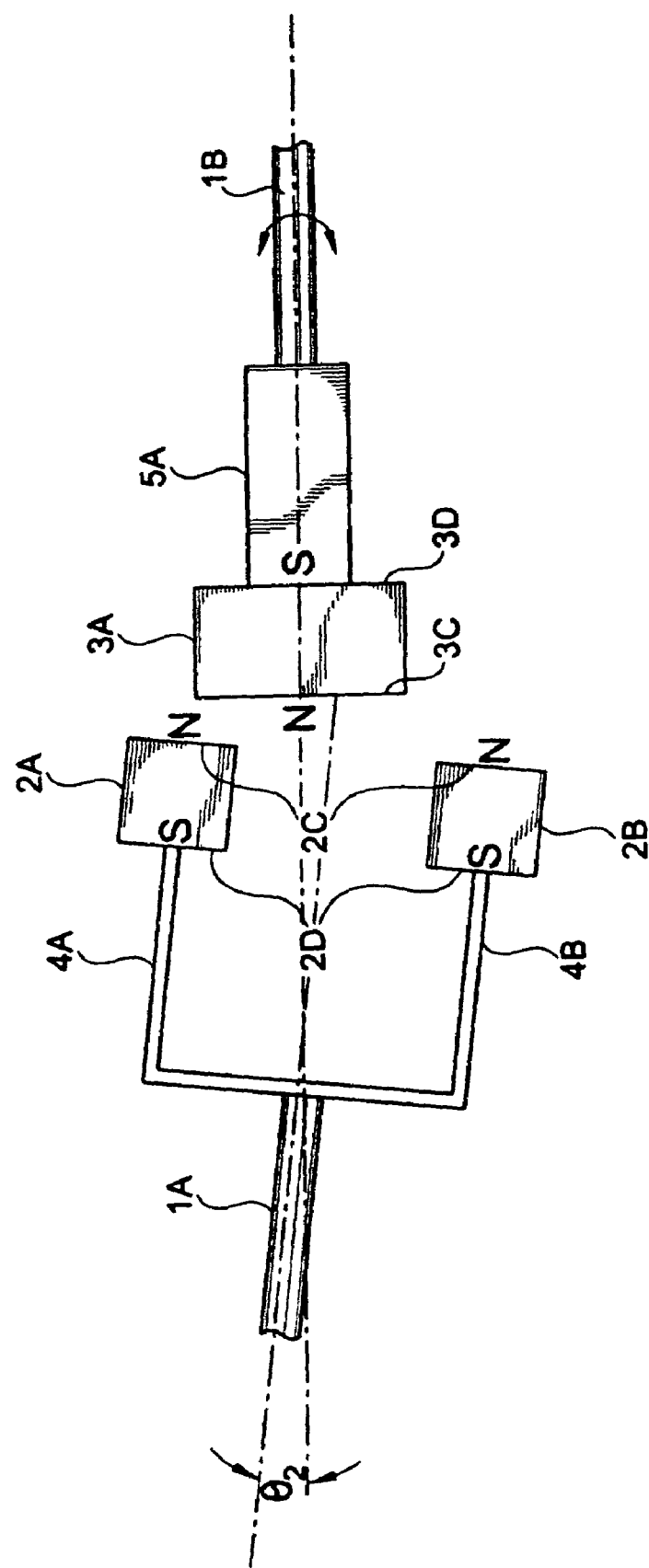
FIG. 16 is a side view of another exemplary torque transfer system according to the present invention.

FIG. 15 is a side view of another exemplary torque transfer system according to the present invention. In FIG. 15, the first and second rotational shafts 1A and 1B may be offset from one another by an angle $\theta_1$, wherein the first rotational shaft 1A extends along a first axial direction and the second rotational shaft 1B extends along a second axial direction that differs from the first axial direction by the angle $\theta_1$. Accordingly, the first faces 3C of the second pair of magnetic members 3A and 3B may be skewed (i.e., antiparallel) from the first faces 2C of the first pair of magnetic members 2A and 2B. Thus, the offset of the first and second rotational shafts 1A and 1B may be accommodated by an adjustment of the repelling magnetic fields between the first and second pairs of magnetic members 2A/2B and 3A/3B. Moreover, as shown in FIG. 16, the first and second rotational shafts 1A and 1B may be offset from one another by an angle $\theta_2$, wherein the first rotational shaft 1A extends along a first axial direction and the second rotational shaft 1B extends along a second axial direction that differs from the first axial direction by the angle $\theta_2$. Furthermore, as shown in FIG. 17, the first and second rotational shafts 1A and 1B may be mutually offset from a center line angles of $\theta_3$ and $\theta_4$, wherein the first rotational shaft 1A extends along a first axial direction offset from a center line by the angle $\theta_4$ and the second rotational shaft 1B extends along a second axial direction offset from the center line by the angle $\theta_3$ that may, or may not differ from the angle $\theta_4$.

Figure 17:
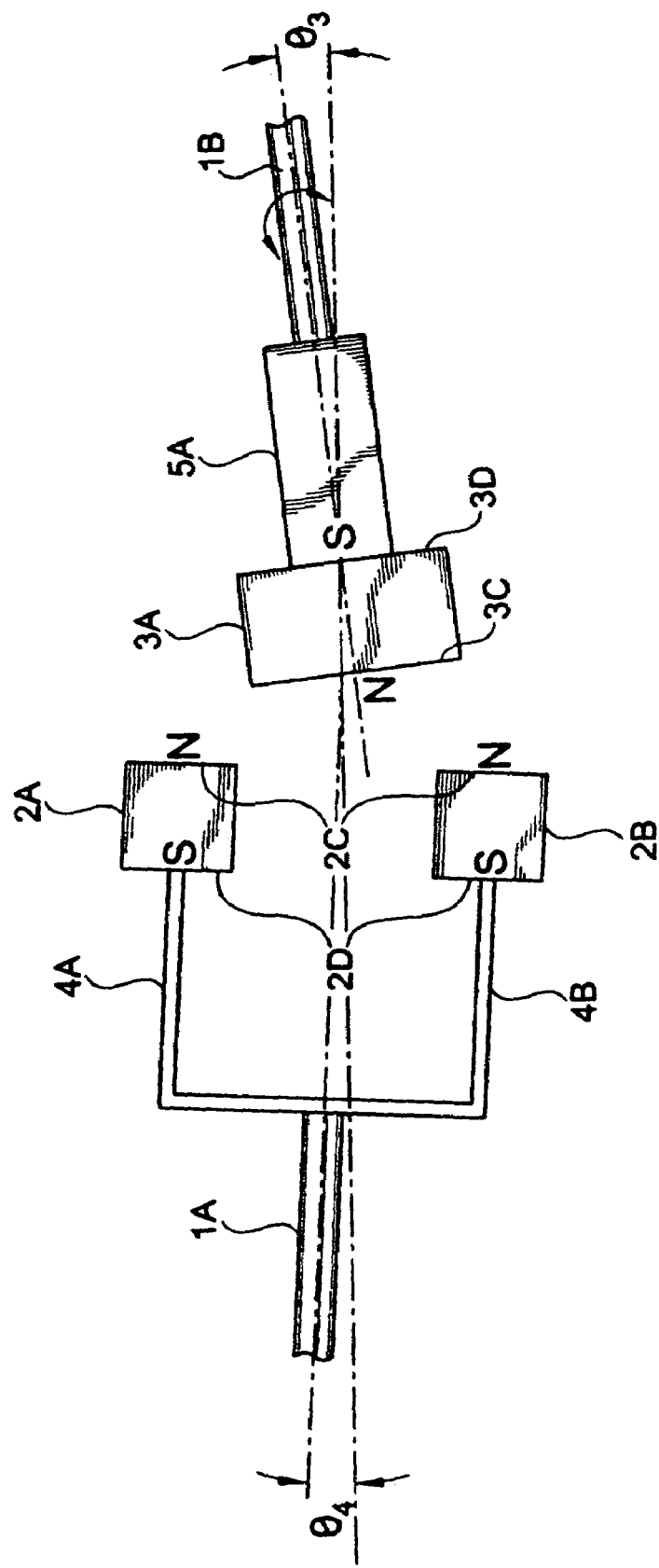
FIG. 17 is a side view of another exemplary torque transfer system according to the present invention.

In FIGS. 15, 16, and 17, the angles $\theta_1$, $\theta_2$, $\theta_3$, and $\theta_4$ may all be the same or may be different from each other. For example, angles $\theta_1$, $\theta_2$, $\theta_3$, and $\theta_4$ may be within a range from slightly more than 0 degrees to slightly less than 45 degrees. Accordingly, the magnetic strengths of the first and second pairs of magnetic members 2A/2B and 3A/3B, as well as the distances separating the first and second pairs of magnetic members 2A/2B and 3A/3B, may determine the ranges for the angles $\theta_1$, $\theta_2$, $\theta_3$, and $\theta_4$. Furthermore, the distances between the first faces 3C of the second pair of magnetic members 3A and 3B and the first faces 2C of the first pair of magnetic members 2A and 2B may determine the ranges for the angles $\theta_1$, $\theta_2$, $\theta_3$, and $\theta_4$.

Although not shown in FIGS. 15, 16, and 17, a barrier (similar to the barrier 10, in FIG. 14), may be disposed between the first and second pairs of magnetic members 2A/2B and 3A/3B. In addition, the barrier (not shown) may not necessarily be a flat-type barrier, but may have a plurality of different geometries. For example, the barrier (not shown) may be formed of a curved surface or a non-linear surface.

Figure 18:
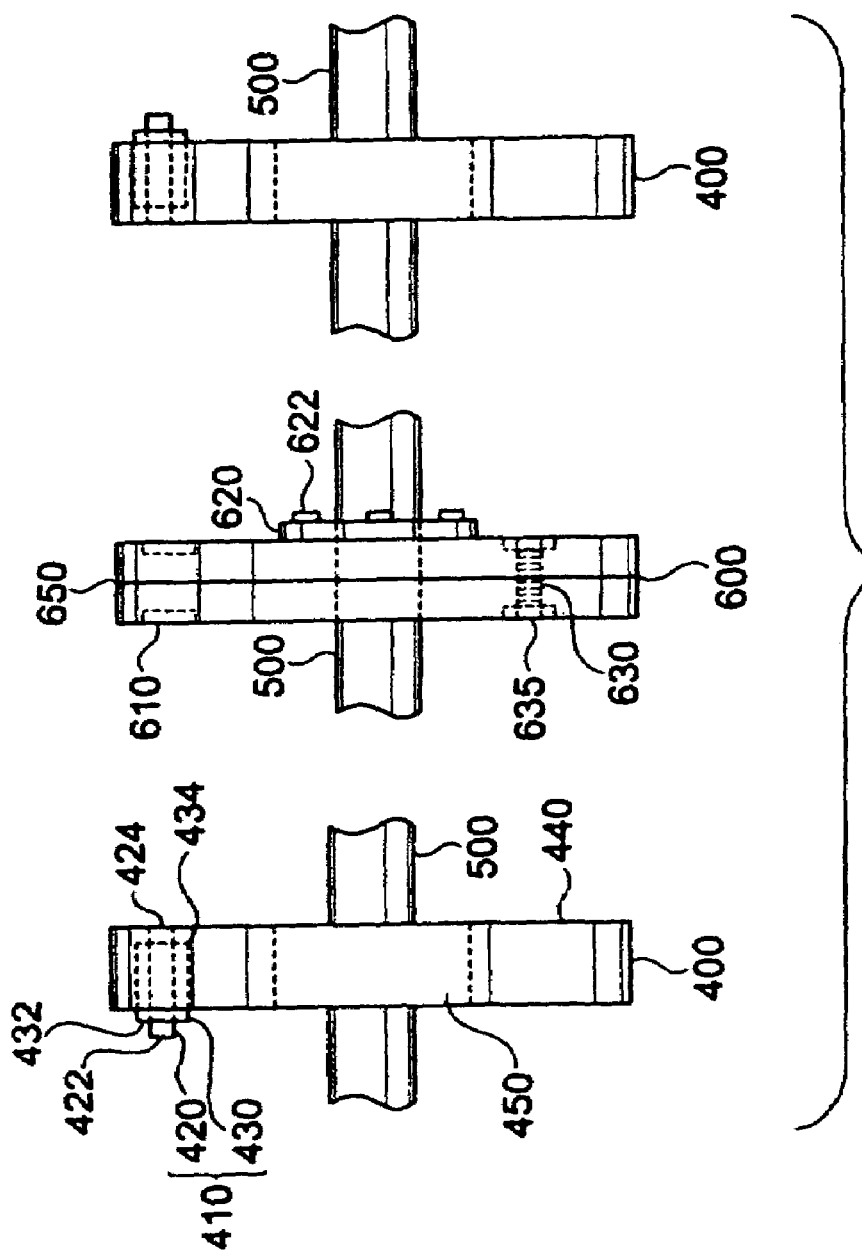
FIG. 18 is a schematic side view of an exemplary multivariable generator according to the present invention.

FIG. 18 is schematic side view of an exemplary multi-variable generator according to the present invention. In FIG. 18, a generator may include a rotor 600 and a pair of stators 400 each disposed on opposing sides of the rotor 600. Each of the rotor 600 and the stators 400 may be made from non-magnetic materials. Alternatively, the generator may include a single rotor 600 and one stator 400 disposed at one side of the single rotor 600. The rotor 600 may include a plurality of magnetic sources 610 disposed through a thickness of the rotor 600, and the stator 400 may include a plurality of coil members 410 each disposed along a circumferential portion of the stator 400. For example, the stators 400 may include an "n"-number of the coil members 410, whereas the rotor 600 may include an "n+1"-number of the magnetic members 610. As an example, the rotor 600 may include an even number of magnetic sources 610, and each of the stators 400 may include an odd number of coil members 410. Alternatively, the rotor 600 may include an odd number of magnetic sources 610, and each of the stators 400 may include an even number of coil members 410.

As shown in FIG. 18, each of the coil members 410 may include a core portion 420 and a coil winding portion 430 disposed concentrically around the core portion 420. The core portion 420 may be disposed so as to have a first end portion 422 extending past a first end region 432 of the coil winding portion 430, and a second end portion 424 extending to be flush with an interior surface 440 of the stator 400. The core portion may be made from amorphous material, such as an amorphous ferrite material, and/or magnetite, and/or a ceramic. In addition, the coil winding portion 430 may include a second end region 434 extending into the stator 400, but offset from the interior surface 440 of the stator 400. Accordingly, diamagnetic opposition may be prevented by offsetting the second end region 434 of the coil winding portion 430 from the interior surface 440 of the stator 400. The stator 400 may further include a through-hole 450 to accommodate a rotating shaft 500 of the rotor 600. In addition, the through-hole 450 may be used for alignment of the rotating shaft 500 of the rotor 600.

Although not shown in FIG. 18, each of the coil winding portions 430 of the stator 400 may include at least two conductive leads that may be electrically connected to a control system. Accordingly, the current induced to the coiling winding portions 430 may be fed to the control system for controlling an output of the generator. Although the coil winding portions 430 may include two conductive leads, the coil winding portions 430 may include multiple "taps" having a plurality of conductive leads.

Figure 19:
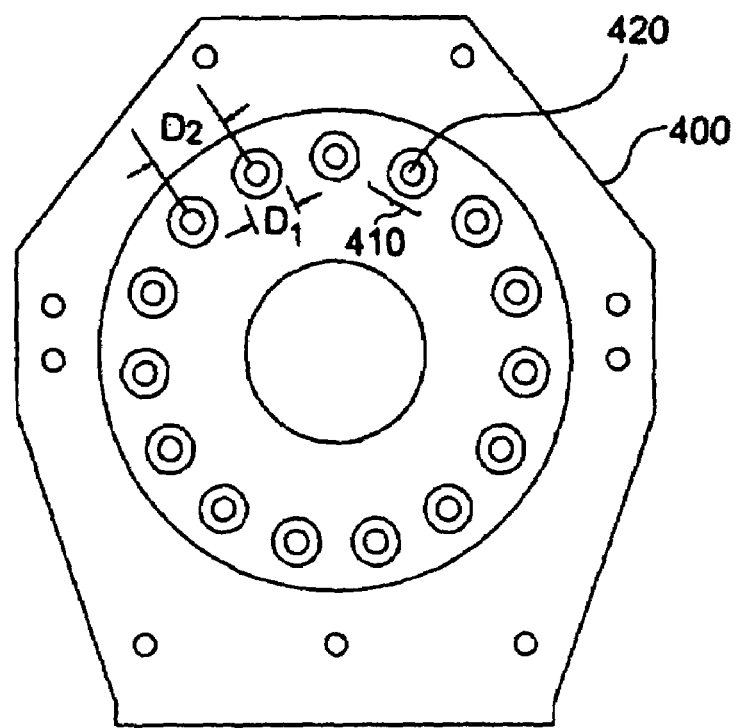
FIG. 19 is a schematic plan view of an exemplary generator stator according to the present invention.

FIG. 19 is a schematic view of an exemplary generator stator according to the present invention. In FIG. 19, the coil members 410 may be distributed to be equally spaced apart around the circumference of the stator 400. For example, each of the coil members 410 may have an outermost diameter D1 and may be spaced apart from each by a distance D2 between the centers of adjacent cores 420. In addition, each of the spaced intervals between adjacent cores 420 may be about twice the outermost diameter distance D1. Accordingly, a relationship between adjacent cores 420 may be approximately represented as D2=2D1. In addition, the total number of coil members 410 may be determined, in part, by the desired output of the generator, as well as the overall physical size of the coil members 410 and the generator itself.

Figure 20:
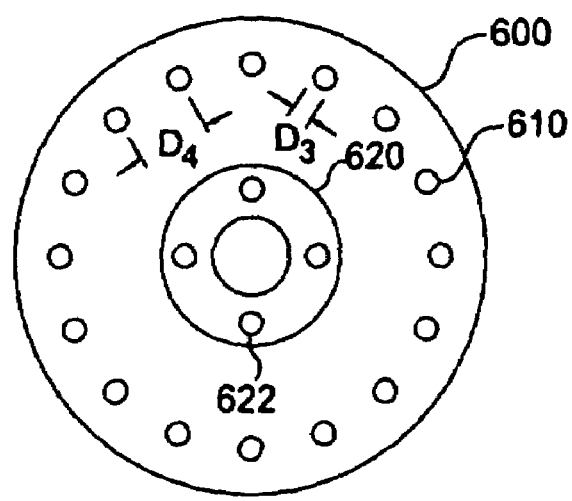
FIG. 20 is a schematic plan view of an exemplary generator rotor according to the present invention.

FIG. 20 is a schematic plan view of an exemplary generator rotor according to the present invention. In FIG. 20, a generator rotor 600 may include the plurality of magnetic sources 610 distributed to be equally spaced apart around the circumference of the rotor 600. For example, each of the magnetic sources 610 may have a diameter D3 and may be spaced apart from each by a distance D4 between the centers of adjacent magnetic sources 610. In addition, each of the spaced intervals between adjacent magnetic sources 610 may be about twice the diameter distance D3. Accordingly, a relationship between adjacent magnetic sources may be approximately represented as D4=2D3. The total number of magnetic sources 610 may be determined, in part, by the desired output of the generator, as well as the overall physical size of the magnetic sources 610 and the generator itself.

In FIG. 18, the rotor 600 may be connected to the rotating shaft 500 using a mechanical fastener system 620 using a plurality of fasteners 622. Although a single mechanical fastener system 620 is shown, mechanical fastener systems 620 may be used on opposing sides of the rotor 600. In addition, the rotating shaft 500 may be inserted through the center portion of the rotor 600. Alternatively, the rotating shaft 500 may include two separate rotating shafts extending from opposing sides of the rotor 600, wherein each separate rotating shaft may be connected to opposing sides of the rotor 600 using a pair of the mechanical fastener systems 620. As shown in FIG. 20, an outer circumference of the mechanical fastener system 620 may be relatively less than the distribution of the magnetic sources 610 spaced apart from the rotating shaft 500, thereby reducing any electro-magnetic interference with the magnetic sources 610 and or with the coil members 410 of the stator 400. In addition, an outer circumference of the mechanical fastener systems 620 may less than the through-hole 450 of the stator 400.

In FIG. 18, each of the magnetic sources 610 may fully extend through the rotor 600, with end portions of each of the magnetic sources 610 being flush with opposing outer surfaces of the rotor 600. In addition, as shown in FIG. 20, each of the magnetic sources 610 may have North N and South S magnetic poles, wherein adjacent magnetic sources 610 may have opposing N and S magnetic poles. Accordingly, since there may be an even number of magnetic sources 610 distributed along the rotor 600, then there may an equal number of N and S magnetic poles.

In FIG. 18, the rotor 600 may be formed as two separate half portions combined with a relatively thin membrane 650 therebetween, or the rotor 600 may be formed a single unitary body. In addition, as shown in FIG. 18, the rotor 600 may include a plurality of countersunk bolts 630 and nuts 635 distributed along a circumference of the rotor 600 to assist coupling the separate halves of the rotor 600 together. If the rotor 600 is formed of a single unitary body, then use of the countersunk bolts 630 and nuts 635 may not be unnecessary.

Figure 21:
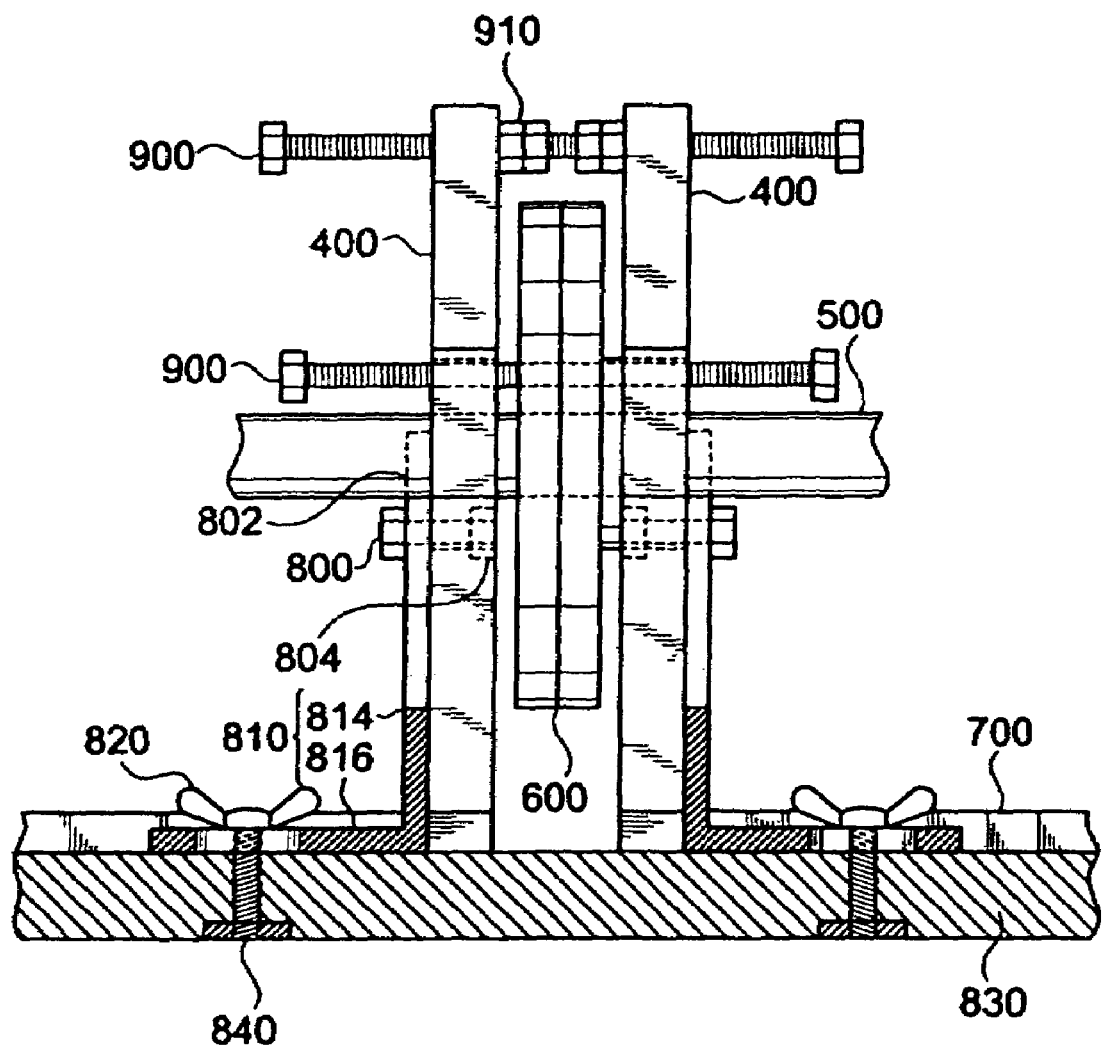
FIG. 21 is a schematic view of an exemplary assembled generator according to the present invention.

FIG. 21 is a schematic view of an exemplary assembled generator according to the present invention. In FIG. 21, both of the stators 400 are positioned to sandwich the rotor 600 and are separated therefrom by a relatively small distance. For example, positioning of the stators 400 with the rotor may be accomplished so as to provide a distance within a range of a few thousandths of an inch to a few tenths of an inch between the respective faces of the cores 420 (in FIG. 18) and the magnetic sources 610 (in FIG. 18). Thus, the distance between the faces of the cores 420 and the magnetic sources 610 may be adjusted by use of adjusting fasteners 900 that may be distributed along the outermost circumference of the stators 400 and extend through the stators 400. In addition, a double fastener pair 910 may used in conjunction with the adjusting fasteners 900 to provide a positively locked assembly.

In FIG. 21, a plurality of frame fasteners 800 may be provided to mechanically affix the stators 400 to a base member 830 using a plurality of base fastener pairs 820 and 840. Each of the frame fasteners 800 may extend through holes 802 at an upper portion 814 of a frame member 810 into a portion of the stators 400 to be fastened to a stator fastener 804 provided at the interior surface 440 (in FIG. 18) of the stator 400. Accordingly, a lower portion 816 of the frame member 810 may be affixed to the base member 830 using a plurality of the base fastener pairs 820 and 840.

FIGS. 22-29 are exemplary applications of the torque converters, generators, and torque transfer systems previously presented. In each of the exemplary applications shown in FIGS. 22-29, a transfer system may be employed that may include a torque system, as shown in any of FIGS. 13-17. Of course, other transfer systems may be used as well. In addition, as disclosed above, a generator system may be employed that may include a generator, as shown in any of FIGS. 18-21. Furthermore, the torque converter system may include a torque converter, as in any of FIGS. 1-12.

Figure 22:
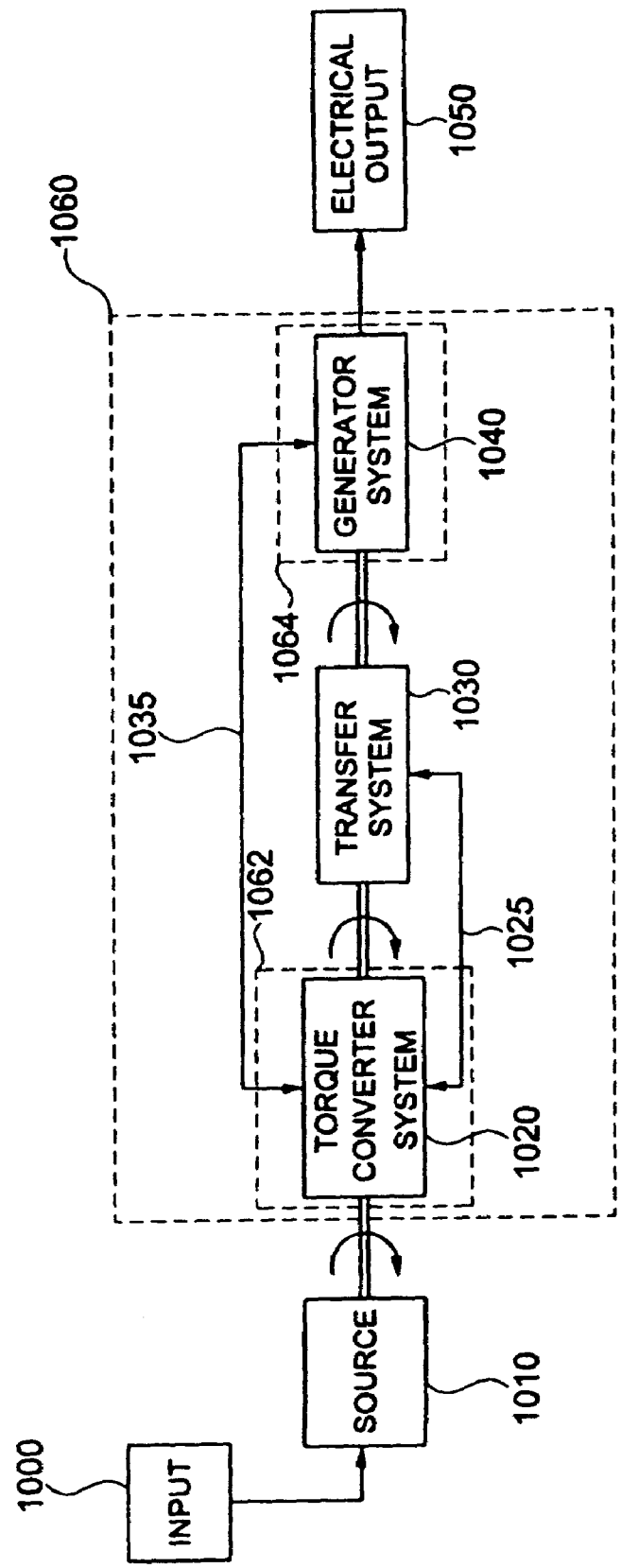
FIG. 22 is a schematic diagram of an exemplary mobile power generation system according to the present invention.

FIG. 22 is a schematic diagram of an exemplary mobile power generation system according to the present invention. In FIG. 22, a mobile power generation system may include a torque converter 1020 receiving rotational motion from a source 1010 that receives an input 1000 to control the source 1010. The torque converter 1020 may provide an output coupled to a generator 1040 via a transfer system 1030, and an output of the generator 1040 may be provided as an electrical output 1050.

In FIG. 22, the transfer system 1030 couples the output of the torque converted 1020 to the generator system 1040. The transfer system 1030 may provide a gradual coupling of the output from the torque converter 1020 to an input of the generator system 1040 in order to prevent any instantaneous loading of either the torque converter 1020 or the generator system 1040. Accordingly, the transfer system 1030 may be controlled by a communication link 1025 between the transfer system 1030 and the torque converter 1020 in order to provide the gradual coupling of the torque converter 1020 to the generator system 1040. As an example, the transfer system 1030 may provide feedback to the torque converter 1020 indicative of operational condition, such as speed, acceleration, deceleration, and torque, in order to reduce, increase, or keep constant the rotational output of the torque converter 1020. Similarly, the torque converter 1020 may provide information to the transfer system 1030 that is indicative of operational condition, such as speed, acceleration, deceleration, and torque, in order to gradually couple or decouple the transfer system 1030 to/from the torque converter 1020.

In FIG. 22, the torque converter system 1020 may be mutually connected to the generator system 1040 via communication link 1035 in order to provide relational function status of the torque converter system 1020 and the generator system 1040. For example, operational state (i.e., speed, acceleration, deceleration, etc.) of the torque converter system 1020 may be monitored by the generator system 1040, and operational state (i.e., speed, acceleration, deceleration, electrical output, etc.) of the generator system 1040 may be monitored by the torque converter system 1020. Accordingly, variations of the torque converter system 1020 and the generator system 1040 may be mutually monitored and controlled. In addition, the generator system 1040 may provide electrical energy to the source 1010 to drive in whole or in-part the torque converter system 1020 instead of using the input 1000.

The torque converter system 1020 may be provided with a shielding 1062 in order to prevent transmission of sound and/or magnetic field interference. The shielding 1062 also prevents outside signals from interfering with the torque converter system 1020. Likewise, the generator system 1040 may be provided with a shielding 1064. Furthermore, or in the alternative, a shielding 1060 may be provided around the each of the torque converter 1020, the transfer system 1030, and the generator system 1040.

Figure 23:
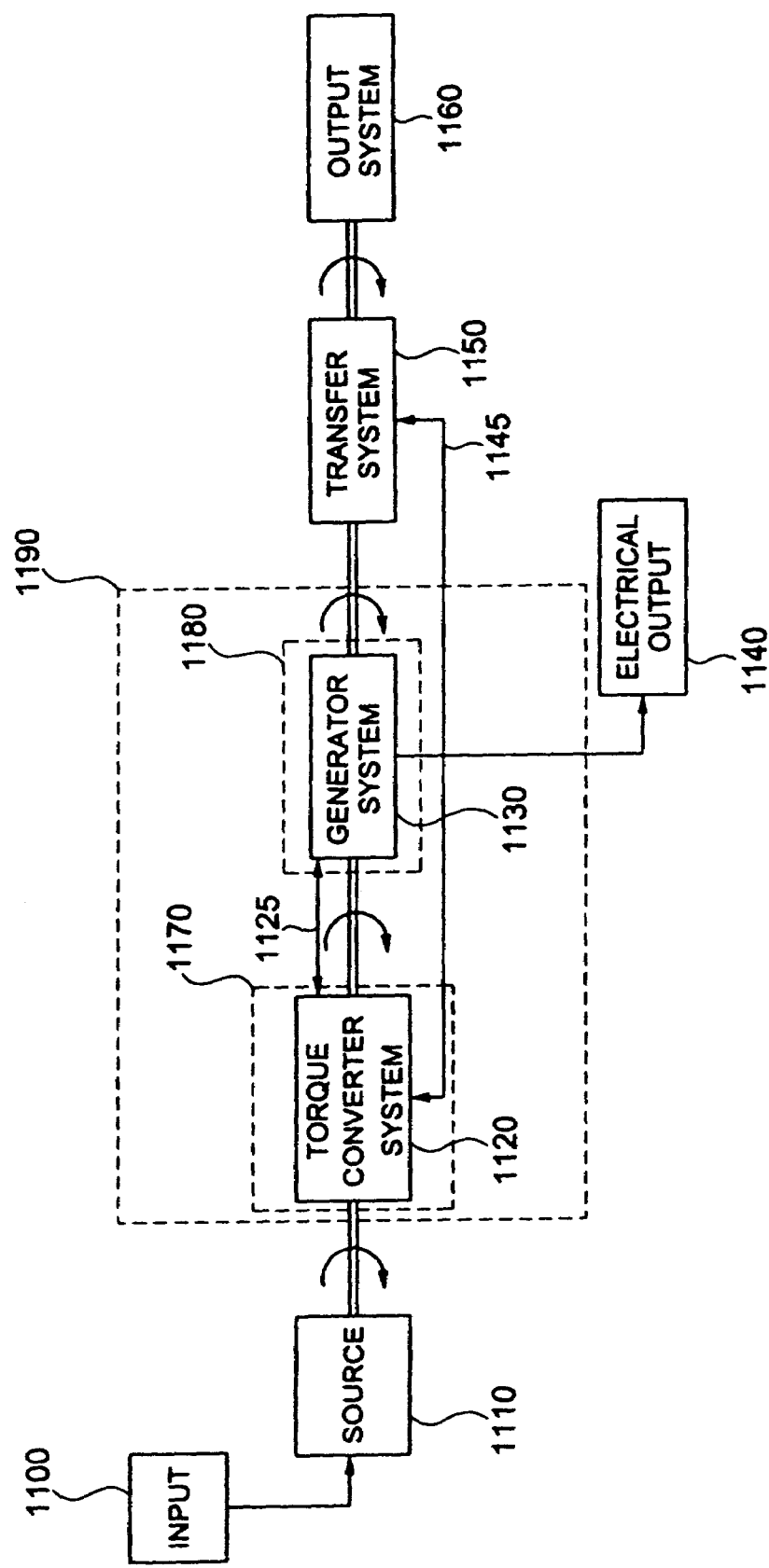
FIG. 23 is a schematic diagram of an exemplary variable speed direct drive system according to the present invention.

FIG. 23 is a schematic diagram of an exemplary drive system according to the present invention. In FIG. 23, a drive system may include a torque converter 1120 receiving rotational motion from a source 1110 that receives an input 1100 to drive the source 1110. The torque converter 1120 may provide an output coupled to a generator system 1130, and an output of the generator system 1130 may be provided as an electrical output 1140. In the addition, the generator system 1130 may also transmit rotational motion to a transfer system 1150 that may coupled to an output system 1160, such as a drive shaft coupled one or more rotationally-driven devices. Accordingly, the generator system 1130 may simultaneously (or separately) produce electrical and rotational outputs 1140 and 1160.

In FIG. 23, the torque converter system 1120 may be mutually connected to the generator system 1130 via communication link 1125 in order to provide relational function status of the torque converter system 1120 and the generator system 1130. For example, operational state of the torque converter system 1120 may be monitored by the generator system 1130, and operational state of the generator system 1130 may be monitored by the torque converter system 1120. Accordingly, variations of the torque converter system 1120 and the generator system 1130 may be mutually monitored and controlled. In addition, the generator system 1130 may provide electrical energy to drive the torque converter system 1120 instead of using the source 1110 and the input 1100.

The torque converter system 1120 may be provided with a shielding 1170 in order to prevent transmission of sound and/or magnetic field interference. Moreover, the shielding 1170 may prevent outside signals from interfering with the torque converter system 1120. Likewise, the generator system 1130 may be provided with a shielding 1180. Furthermore, or in the alternative, a shielding 1190 may be provided for the torque converter 1120 and the generator system 1130.

According to the present invention, both electric and rotational energies may be produced without any appreciable interference from ambient surroundings, and the electric and rotational energies produced by the exemplary drive system may not be detectable. Thus, the exemplary drive system according to the present invention provides electric and rotational energies that may not be detectable.

Figure 24:
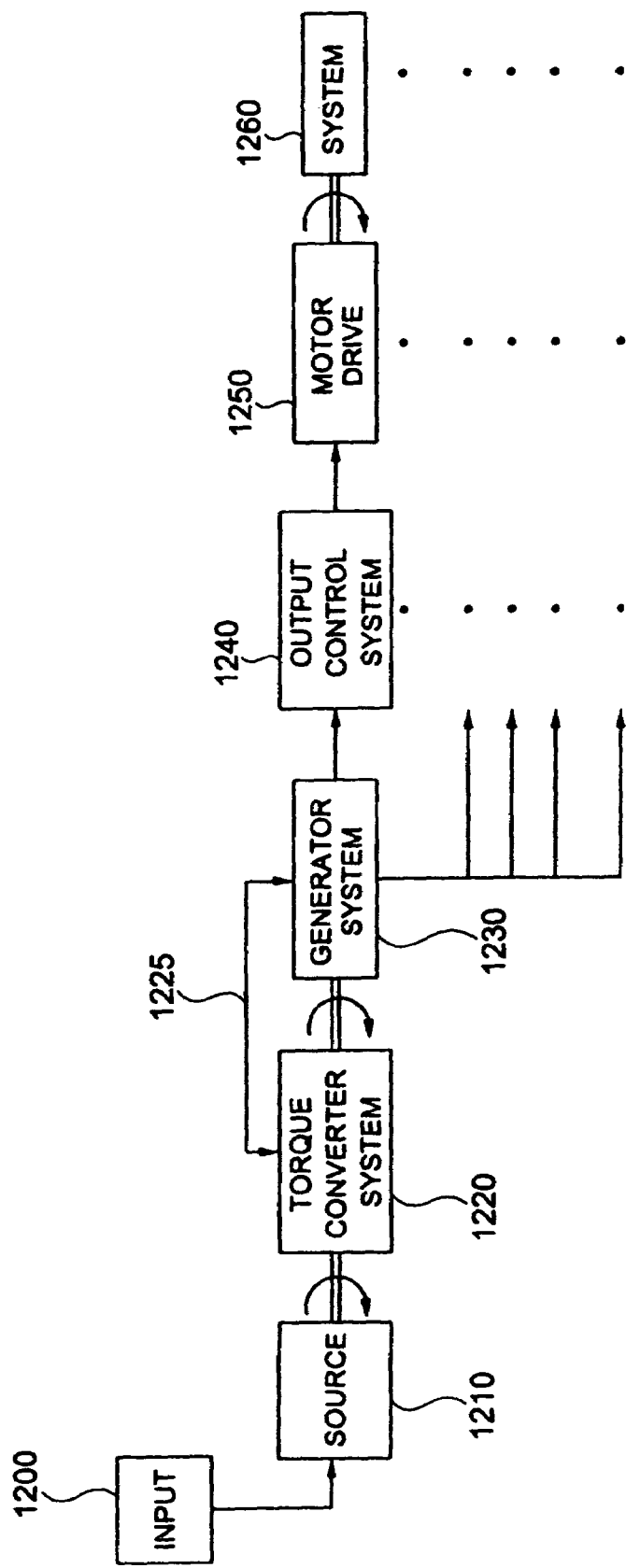
FIG. 24 is a schematic diagram of an exemplary vehicle transmission system according to the present invention.

FIG. 24 is a schematic diagram of an exemplary variable speed direct drive system according to the present invention. In FIG. 24, a variable speed direct drive system may include a torque converter 1220 receiving rotational motion from a source 1210 that is driven by an input 1200. The torque converter system 1220 may provide an output coupled to a generator system 1230, and an output of the generator system 1230 may be provided as one or multiple electrical outputs 1240. If multiple outputs are provided, they could be either different electrical outputs or similar electrical outputs. Accordingly, the generator system 1230 may simultaneously (or separately) produce electrical outputs 1240 each coupled to a motor drive 1250 in order to provide rotational motion to a system 1260, such as wheels, brake systems, and sub-systems requiring rotational motion.

In FIG. 24, the torque converter system 1220 may be mutually connected to the generator system 1230 via communication link 1225 in order to provide relational function status of the torque converter system 1220 and the generator system 1230. As an example, the generator system 1230 may provide feedback to the torque converter system 1220 indicative of operational condition, such as speed, acceleration, deceleration, and torque, in order to reduce, increase, or keep constant the rotational output of the torque converter system 1220. Similarly, the torque converter system 1220 may provide information to the generator system 1230 that is indicative of operational condition, such as speed, acceleration, deceleration, and torque, in order to increase or decrease output of the generator system 1230. Accordingly, variations of the torque converter system 1220 and the generator system 1230 may be mutually monitored and controlled. In addition, the generator system 1230 may provide electrical energy to drive the torque converter system 1220 instead of using the source 1210 and the input 1200.

According to the present invention, multiple systems, or sub-systems may be operated. In addition, the exemplary variable speed direct drive system may provide a gyroscopic effect depending upon orientation of the torque converter system. For example, placing one of each of the exemplary variable speed direct drive systems at wheels of a vehicle may provide for stability while the vehicle is turning corners or passing through curved roadways.

Figure 25:
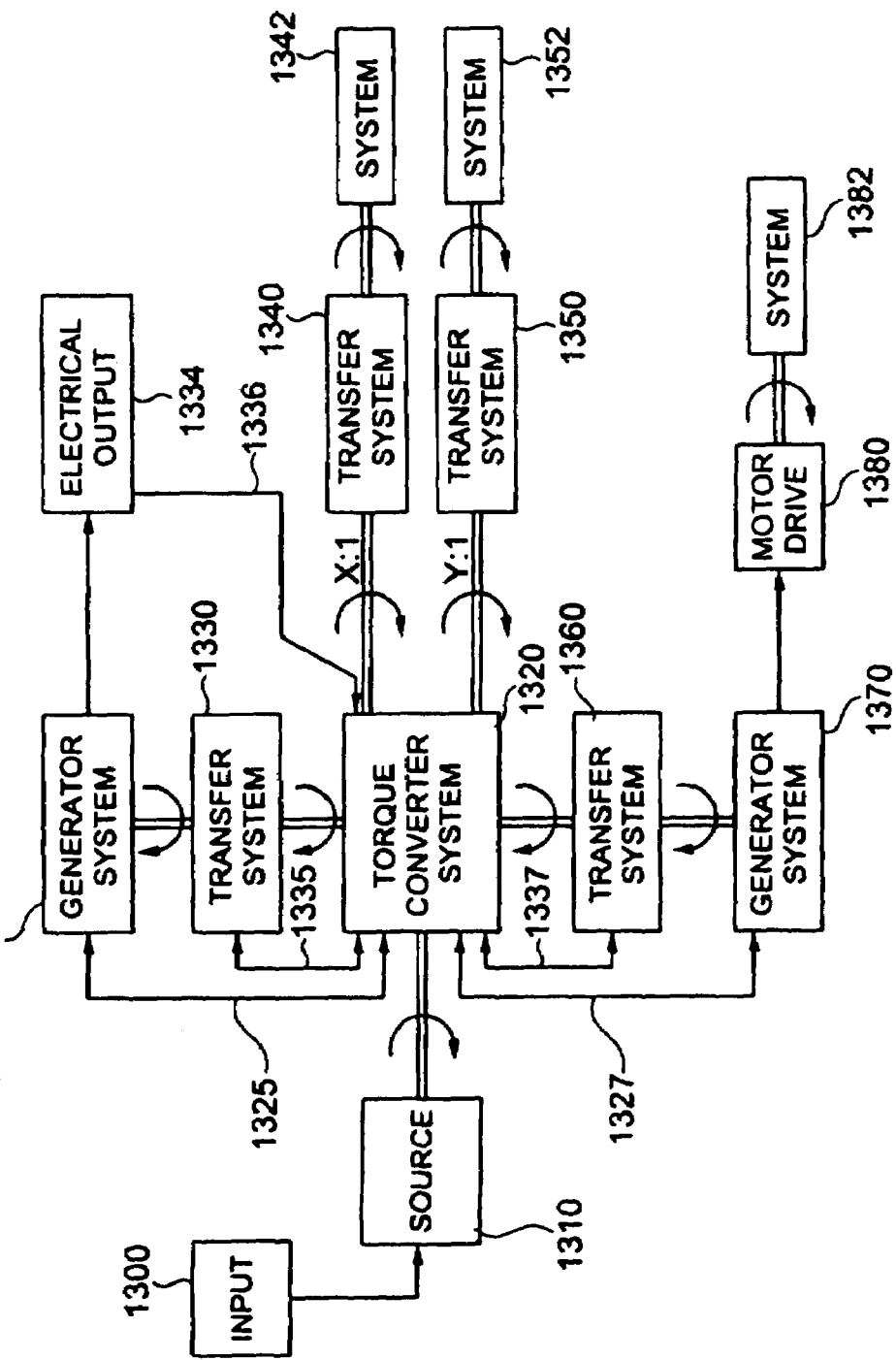
FIG. 25 is a schematic diagram of another exemplary vehicle transmission system according to the present invention.

FIG. 25 is a schematic diagram of an exemplary vehicle transmission system according to the present invention. In FIG. 25, a vehicle transmission system may include a torque converter 1320 receiving rotational motion from a source

1310 that in driven by an input 1300. The torque converter 1320 may provide multiple outputs to provide both rotational and electrical energies.

In FIG. 25, the torque converter 1320 may produce a first output to a transfer system 1330 that, in turn, may produce a rotational energy to drive a generator system 1332. Accordingly, the generator system 1332 may produce an electrical output 1334. In addition, the torque converter 1320 may produce a second output to a transfer system 1340 that, in turn, may produce a rotational energy to a system 1342. The rotational energy provided to system 1342 may have a rotation ratio of X:1, wherein X may be 2, 4, 16, and 32, compared to a rotational speed of the source 1310 to the torque converter system 1320. Furthermore, the torque converter 1320 may produce a third output to a transfer system 1350 that, in turn, may produce a rotational energy to a system 1352. Accordingly, the rotational energy provided to system 1352 may have a rotation ratio of Y:1, wherein Y may be 2, 4, 16, and 32, or may be equal to X, compared to a rotational speed of the source 1310 to the torque converter system 1320. Finally, the torque converter 1320 may produce a fourth output to a transfer system 1360 that, in turn, may produce a rotational energy to a generator system 1370. Accordingly, the generator system 1370 may produce an electrical output to a motor drive 1380 coupled to a system 1382.

In FIG. 25, each of the transfer systems 1330, 1340, 1350, and 1360 couples the output of the torque converted 1320 to one of the generator systems 1332 and 1370 or to the systems 1342 and 1352. The transfer systems 1330, 1340, 1350, and 1360 may provide a gradual coupling of the output from the torque converter 1320 to an input of the generator systems 1332 and 1370 and to the systems 1342 and 1352 in order to prevent any instantaneous loading of either the torque converter 1320 or the generator systems 1332 and 1370 and the systems 1342 and 1352. Accordingly, the transfer systems 1330 and 1360 may be controlled by communication links 1335 and 1337 between the transfer systems 1330 and 1360, respectively, and the torque converter system 1320 in order to provide the gradual coupling of the torque converter system 1320 to the generator systems 1332 and 1370. In addition, the communication links 1335 and 1337 may also provide relational function status of the torque converter system 1320 and the transfer systems 1330 and 1360. Furthermore, an electrical energy from the electrical output 1334 may be fed back into the torque converter system 1320, via connection 1336, to drive the torque converter 1320, such that the source 1310 and input 1300 may not be necessary.

In FIG. 25, the torque converter system 1320 may be mutually connected to the generator systems 1332 and 1370 via communication links 1325 and 1327 in order to provide relational function status (i.e., speed, acceleration, deceleration, etc.) of the torque converter system 1320 and the generator systems 1332 and 1370. For example, operational state of the torque converter system 1320 may be monitored by the generator systems 1332 and 1370, and operational state of the generator systems 1332 and 1370 may be monitored by the torque converter system 1320. Accordingly, variations of the torque converter system 1320 and the generator systems 1332 and 1370 may be mutually monitored and controlled in order to provide a balanced overall system. In addition, the generator systems 1332 and 1370 may provide electrical energy to drive the torque converter system 1320 instead of using the source 1310 and the input 1300.

Figure 26:
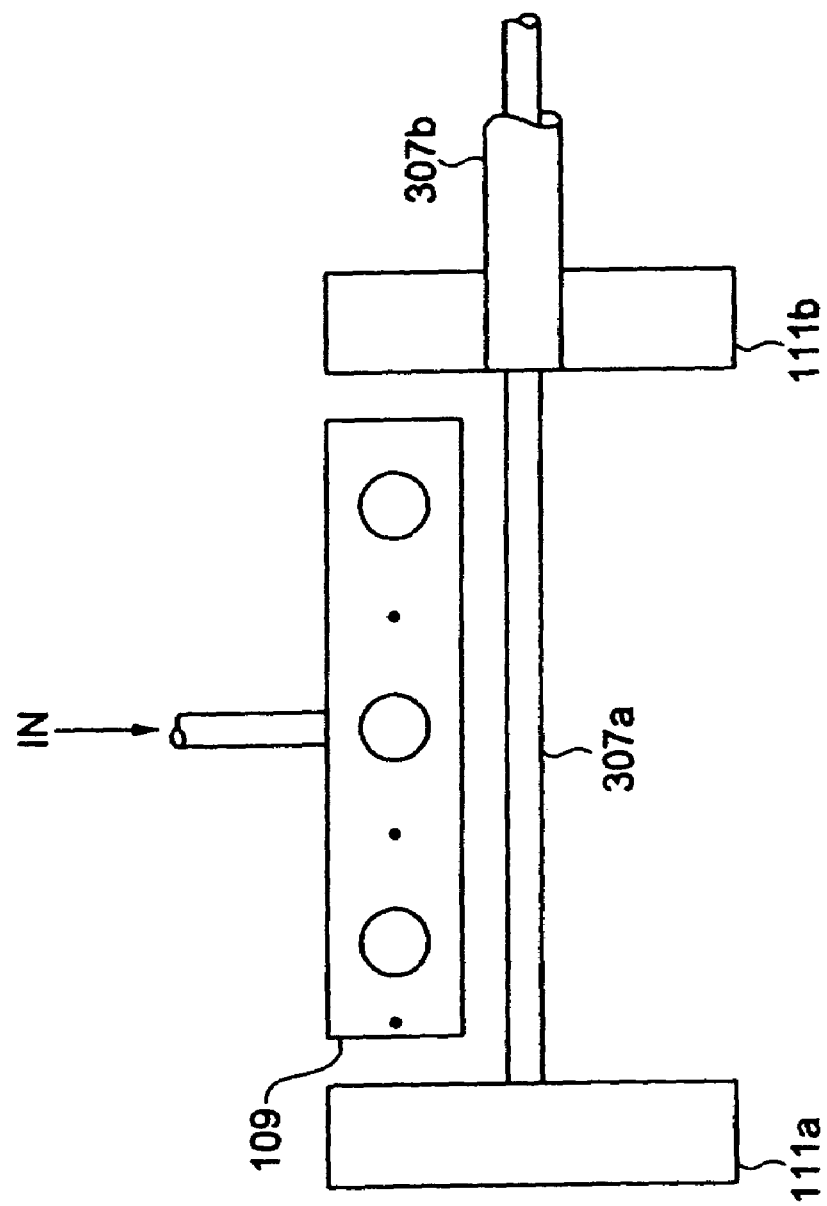
FIG. 26 is an exemplary dual output shaft system according to the present invention.

FIG. 26 is an exemplary dual output shaft system according to the present invention. In FIG. 26, a dual output shaft system may include a single flywheel 109 magnetically coupled to a pair of generator disks 111a and 111b. The flywheel 109 may have various configurations, as detailed in FIG. 1, and the generator disks 111a and 111b, as shown in FIG. 4. Each of the generator disks 111a and 111b may be coupled to shafts 307a and 307b, respectively, wherein the shaft 307a may be concentrically aligned with the shaft 307b to produce opposing rotational motions about a common axis. For example, the shaft 307a may pass through a center portion of the second generator disk 111b and along an axial length of the shaft 307b.

In addition, depending upon the magnetic coupling configuration between the flywheel 109 and each of the generator disks 111a and 111b (i.e., relative rotation ratios), different rotation ratios X:1 and Y:1, respectively, in FIG. 25, may be produced. For example, the first generator disk 111a may be magnetically coupled to the flywheel 109 at one-half the magnetic coupling of the second generator disk 111b to the flywheel 109. Accordingly, the rotation ratio X:1 of the first generator disk 111a may be one-half the rotation ratio Y:1 of the second generator disk 111b. Of course, the relative rotation ratio X:Y may be varied by changing the magnetic couplings of the first and second generator disks 111a and 111b.

According to the present invention, an exemplary vehicle transmission system may include a single torque converter system 1320 to provide at least four different outputs to systems or sub-systems of a vehicle. Thus, both rotational and electrical energies may be produced by a single source system, thereby simplifying vehicle design and operation.

Figure 27:
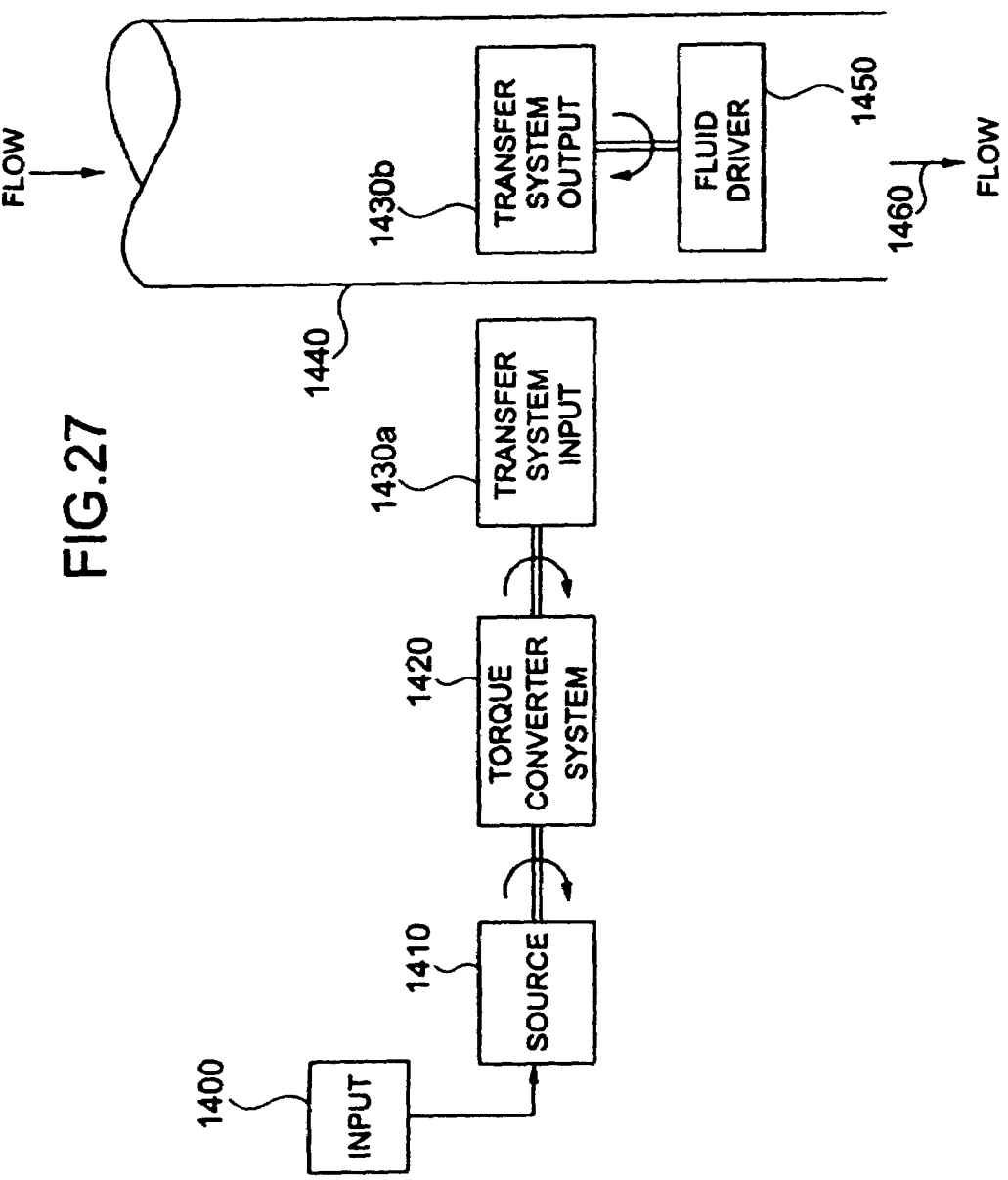
FIG. 27 is a schematic diagram of an exemplary internal impeller system according to the present invention.

FIG. 27 is a schematic diagram of an exemplary internal impeller system according to the present invention. In FIG. 27, an internal impeller system may include a torque converter system 1420 receiving a rotational input from a source 1410 driven by an input 1400. The torque converter 1420 provides a rotational output to a transfer system input 1430a. Accordingly, the rotational output provided to the transfer system input 1430a may be transmitted through a sidewall portion of a fluid conduit 1440 to a transfer system output 1430b. Thus, a fluid driver 1450 (i.e., impeller or turbine) coupled to the transfer system output 1430b may be driven by the torque converter system 1420, thereby driving a fluid 1460 through the fluid conduit 1440.

In FIG. 27, the internal impeller system may be reversed such that the fluid 1460 flowing through the fluid conduit 1440 may drive the transfer system output 1430b in order to drive the transfer system input 1430a. Accordingly, the torque converter system 1420 may be driven by the flow of the fluid 1460, thereby generating rotational motion to drive a generator (not shown) or some other system requiring rotational motion.

Figure 28:
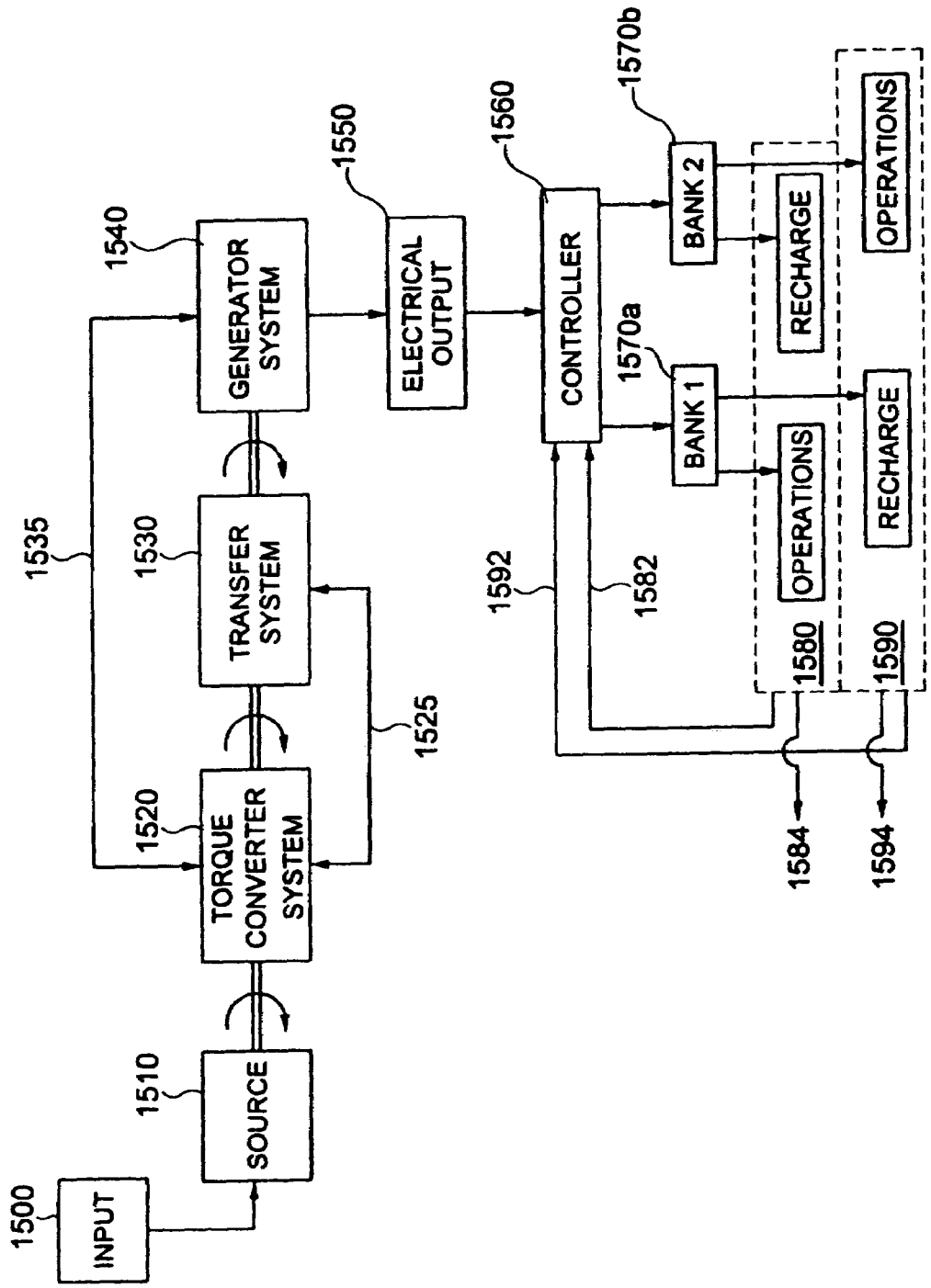
FIG. 28 is a schematic diagram of an exemplary vehicle charging system according to the present invention.

FIG. 28 is a schematic diagram of an exemplary vehicle charging system according to the present invention. In FIG. 28, a vehicle charging system may include a torque converter 1520 receiving a rotational input from a source 1510 driven by an input 1500 to control the source 1510. The torque converter 1520 may provide an output coupled to a generator 1540 via a transfer system 1530, and an output of the generator 1540 may be provided as an electrical output 1550.

In FIG. 28, the transfer system 1530 couples the output of the torque converter 1520 to the generator system 1540. The transfer system 1530 may provide a gradual coupling of the output from the torque converter 1520 to an input of the generator system 1540 in order to prevent any instantaneous loading of either the torque converter 1520 or the generator system 1540. Accordingly, the transfer system 1530 may be controlled by a communication link 1525 between the transfer system 1530 and the torque converter 1520 in order to provide the gradual coupling of the torque converter 1520 to the generator system 1540. In addition, the communication link 1525 may also provide relational function status of the torque converter 1520 and the transfer system 1530.

In FIG. 28, the torque converter system 1520 may be mutually connected to the generator system 1540 via communication link 1535 in order to provide relational function status of the torque converter system 1520 and the generator system 1540. For example, operational state of the torque converter system 1520 may be monitored by the generator system 1540, and operational state of the generator system 1540 may be monitored by the torque converter system 1520. Accordingly, variations of the torque converter system 1520 and the generator system 1540 may be mutually monitored and controlled. In addition, the generator system 1540 may provide electrical energy to drive the torque converter system 1520 instead of using the source 1510 and the input 1500.

In FIG. 28, the electrical output 1550 may be connected to a controller 1560, wherein the controller 1560 distributes the electrical output 1550 from the generator system 1540 to one of a first bank 1570a and a second bank 1570b. In addition, the controller 1560 may convert or condition the electrical output 1550 based upon electrical requirements of the vehicle or vehicle charging system. Both the first bank 1570a and the second bank 1570b produce operations voltages and recharge voltages. For example, a first system 1580 may include the operations voltage from the first bank 1570a and the recharge voltage from the second bank 1570b. Similarly, a second system 1590 may include the recharge voltage from the first bank 1570a and the operations voltage from the second bank 1570b. According to the present invention, the operations and recharge voltages may be differently connected.

As an example, one the first and second systems 1570a and 1570b may always provide operations voltages 1584 or 1594 to operate electrical and electro-mechanical systems of the vehicle, as well as to provide recharge voltages 1584 or 1594 to recharge systems of the vehicle. Moreover, each of the first and second systems 1580 and 1590 provides feedback signals 1582 and 1592, respectively, to the controller 1560 in order to control inputs to the first and second banks 1570a and 1570b. For example, the controller 1560 may provide a switching function to provide the electrical output 1550 to one of the first and second banks 1570a and 1570b based upon the feedback signals 1582 and 1592. Specifically, the feedback signals 1582 and 1592 may indicate voltage levels of the first and second systems 1580 and 1590 in order to direct the switching function of the controller 1560.

Figure 29:
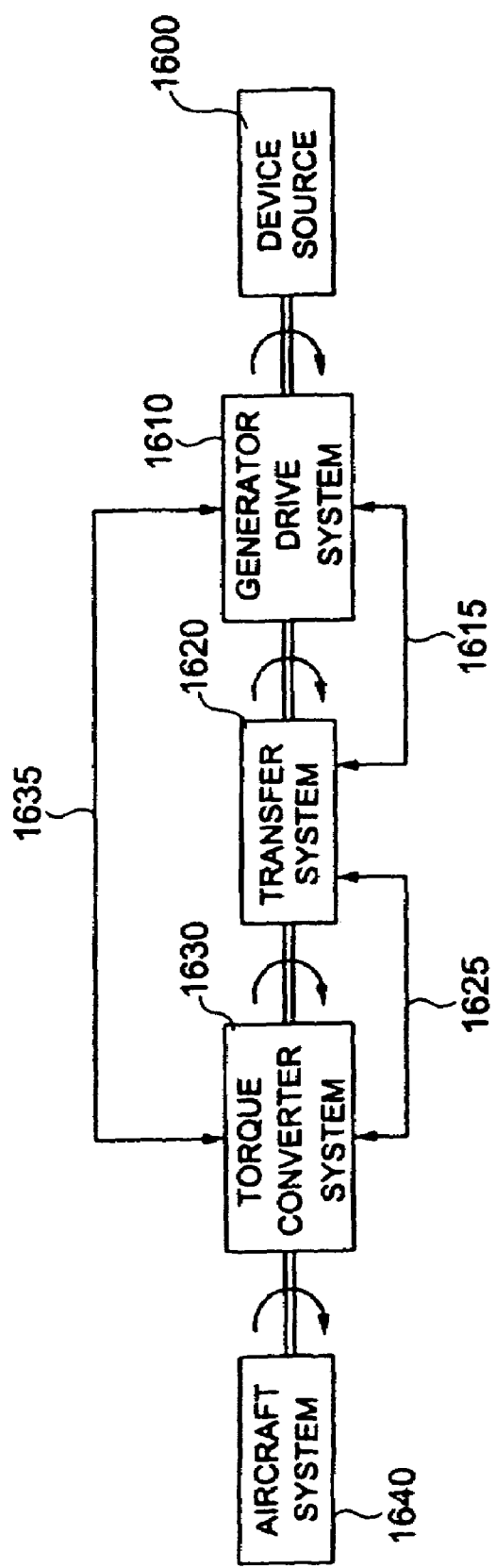
FIG. 29 is a schematic diagram of an exemplary aircraft power system according to the present invention.

FIG. 29 is a schematic diagram of an exemplary aircraft power system according to the present invention. In FIG. 29, an aircraft power system may include a generator drive system 1610 receiving an electrical input from a device source 1600 to produce a rotational energy to an aircraft system 1640, such as a propeller. In addition, the generator drive system 1610 may be coupled to a torque converter system 1630 via a transfer system 1620. The transfer system 1620 couples the rotational motion output by the generator driver system 1610 to the torque converter system 1630. The transfer system 1620 may provide a gradual coupling of the rotational output from the generator system 1610 to an input of the torque converter system 1630 in order to prevent any instantaneous loading of either the generator drive system 1610 or the torque converter system 1630. Accordingly, the transfer system 1620 may be controlled by a communication link 1615 between the generator drive system 1610 and the transfer system 1620 in order to provide the gradual coupling of the generator drive system 1610 to the torque converter system 1630. In addition, the communication link 1625 may also provide relational function status of the transfer system 1620 and the torque converter system 1630.

In FIG. 29, the torque converter system 1630 may be mutually connected to the generator drive system 1610 via communication link 1635 in order to provide relational function status of the torque converter system 1630 and the generator drive system 1610. For example, operational state of the torque converter system 1630 may be monitored by the generator drive system 1610, and operational state of the generator drive system 1610 may be monitored by the torque converter system 1630. Accordingly, variations of the torque converter system 1630 and the generator drive system 1610 may be mutually monitored and controlled.

In FIG. 29, the aircraft system 1640 may include at least one of a hydraulic pump system and/or a power distribution network within an aircraft. In addition, the aircraft system 1640 may include at least one system and/or subsystems that require rotational input for operation. Furthermore, use of the term "aircraft" may also include structures used in zero or near-zero gravity, as well as structures used in marine applications, such as submarines, underwater buildings, and propulsion systems.

Figure 30:
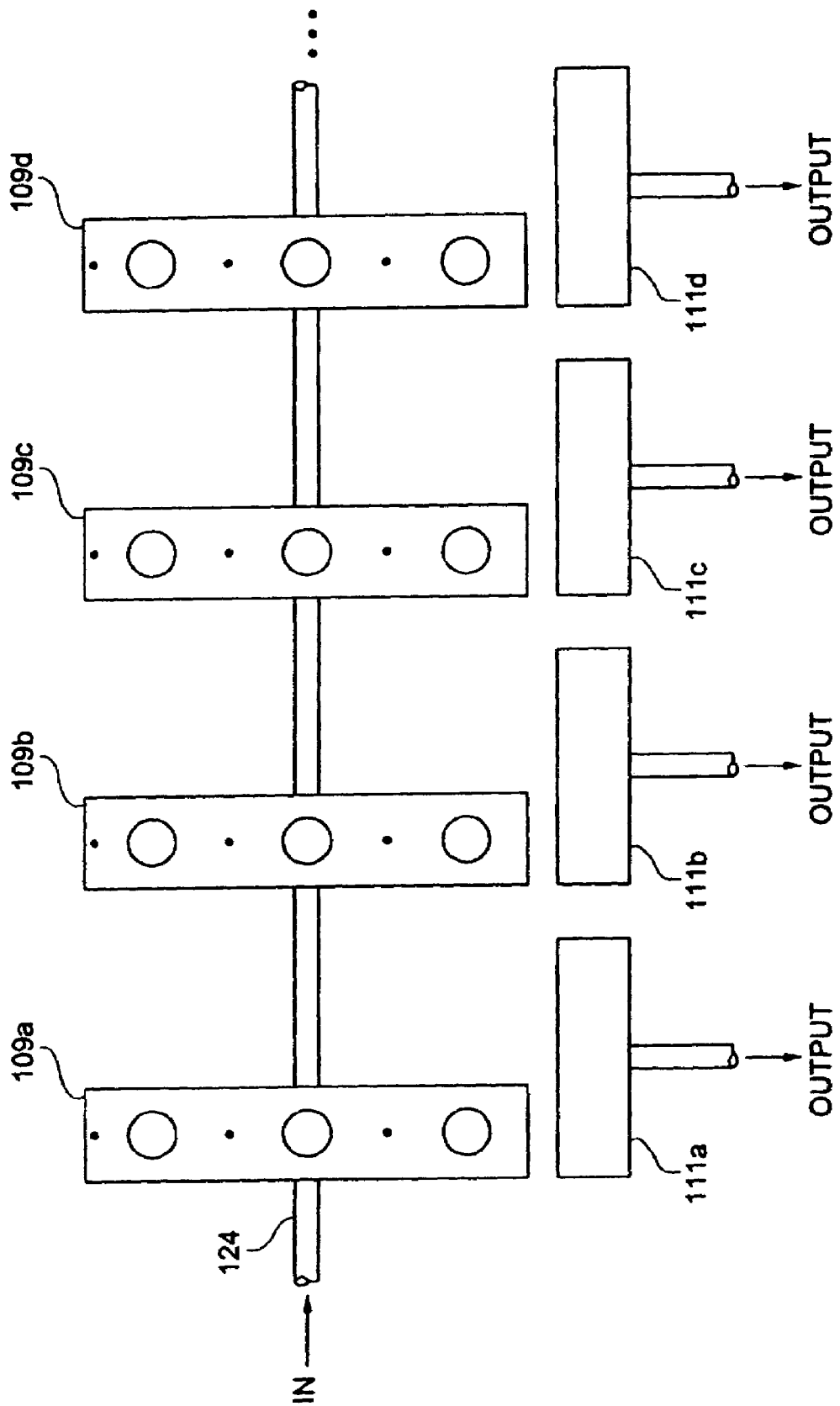
FIG. 30 is a schematic diagram of an exemplary power generating system according to the present invention.

FIG. 30 is a schematic diagram of an exemplary multiple power generating system according to the present invention. In FIG. 30, a shaft 124 may be coupled to a plurality of flywheels 109a-d each magnetically coupled to a plurality of generator disks 111 ad. The flywheels 109a-d may have configurations similar to those shown in FIGS. 1-12, and the generator disks 111a-d may have configurations similar to those shown in FIGS. 4, 5, and 7-1. In addition, the total number of flywheels 109a-d and the total number of generator disks 111a-d may be more or less than those shown in FIG. 30. Accordingly, each of the generator disks 111a-d may produce individual rotational outputs that may be coupled to other devices requiring rotational input. For example, any of the systems shown in FIGS. 22-29 may incorporate the multiple power generating system of FIG. 30.

Figure 31:
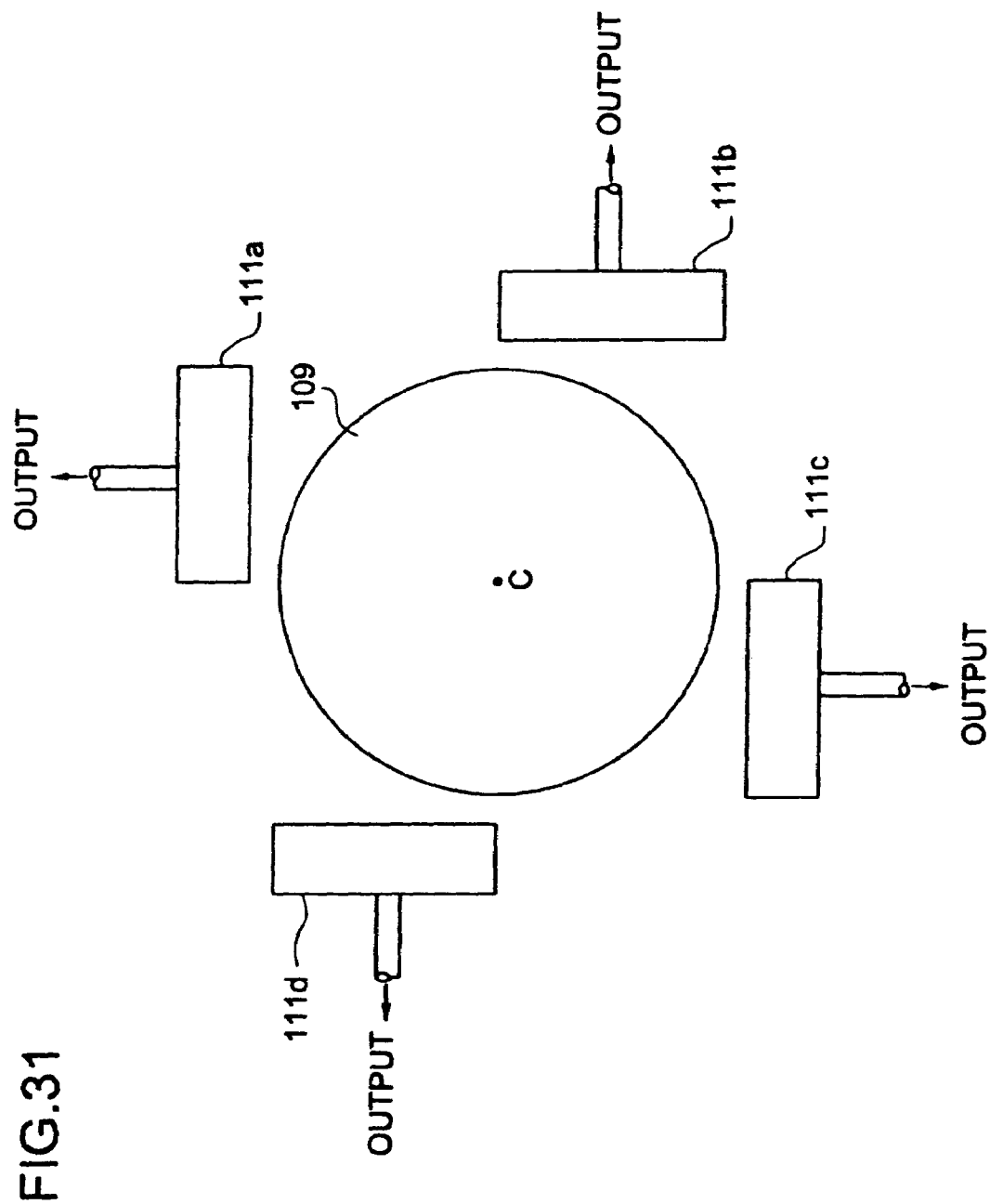
FIG. 31 is a schematic diagram of another exemplary power generating system according to the present invention.

FIG. 31 is a schematic diagram of another exemplary power generating system according to the present invention. In FIG. 31, a single flywheel 109 may be coupled to a plurality of generator disks 111a-d. The flywheel 109 may have a configuration similar to those shown in FIGS. 1-12, and the generator disks 111a-d may have configurations similar to those shown in FIGS. 4, 5, and 7-11. In addition, the total number of generator disks 111a-d may be more or less than those shown in FIG. 31. Accordingly, each of the generator disks 111a-d may produce individual rotational outputs that may be coupled to other devices requiring rotational input. For example, any of the systems shown in FIGS. 22-29 may incorporate the multiple power generating system of FIG. 31.

In addition, according to the present invention, a combination of the individual systems shown in FIGS. 30 and 31 may be provided wherein each of the flywheels 109a-d as shown in FIG. 30, may be coupled to the plurality of generator disks 111a-d, as shown in FIG. 31. Accordingly, each of the flywheels 109a-d, in FIG. 30, may be capable of producing a plurality of rotational outputs from the generator disks 111a-d in FIG. 31. Although four generator disks 111a-d are shown in FIG. 31, different pluralities may be provided to be magnetically coupled to the flywheel 109 upon rotation of the flywheel 109 and the generator disks 111a-d.

According to the present invention, each of the generator disks 111a-d, as shown in FIGS. 30 and 31, may be coupled to any of the exemplary torque transfer systems, as shown in FIGS. 13-17, in order to provide a gradual transfer of torque. In addition, based upon the specific configuration of each of the generator disks 111a-d, different rotational outputs may be provided, as disclosed with respect to the system of FIG. 26.

It will be apparent to those skilled in the art that various modifications and variations can be made in the power generating systems of the present invention without departing from the spirit or scope of the inventions. Thus, it is intended that the present invention covers the modifications and variations of this invention provided they come within the scope of the appended claims and their equivalents.

What is claimed is:

1. A power generating system, comprising:
    a torque converter system receiving a rotational motion having an input torque from a source and producing a plurality of rotational outputs each having an output torque, the torque converter comprising:
        at least one flywheel rotatable about a first axis, each flywheel including a first body portion, a first plurality of magnets mounted in the first body portion, each of the first plurality of magnets extending along a corresponding radial direction with respect to the first axis, and a second plurality of magnets mounted in the first body portion, each of the second plurality of magnets being located between a corresponding adjacent pair of the first plurality of magnets, each flywheel receiving the rotational motion having the input torque; and
        a plurality of generator disks, each generator disk including a second body portion, and a third plurality of magnets within the second body portion magnetically coupled to the first and second pluralities of magnets of one of the flywheels, each generator disk coupled to produce one of the rotational outputs;
    a plurality of transfer systems, each coupled to one of the plurality of rotational outputs; and
    a plurality of generator systems, each coupled to one of the transfer systems.

2. The power generating system according to claim 1, wherein at least two of the rotational outputs have different rotational speeds.

3. The power generating system according to claim 1, wherein an axis of a first one of the generator disks and an axis of a second one of the generator disks are concentric.

4. The power generating system according to claim 1, further comprising a controller that controls the torque converter system and at least two of the transfer systems to provide gradual coupling of the torque converter system to the generator systems.

5. The power generating system according to claim 1, further comprising a connector that connects the torque converter system and the generator systems to provide relational function status of the torque converter system and the generator systems.

6. The power generating system according to claim 1, wherein the generator systems are connected to the torque converter system to drive the torque converter system.

7. The power generating system of claim 1, wherein the first plurality of magnets are permanent magnets.

8. The power generating system of claim 1, wherein the second plurality of magnets are permanent magnets.

9. The power generating system of claim 1, wherein the third plurality of magnets are permanent magnets.

10. The power generating system of claim 9, wherein the first plurality of magnets are permanent magnets.

11. The power generating system of claim 10, wherein the second plurality of magnets are permanent magnets.

12. The power generating system of claim 1, wherein an axis of a first one of the generator disks and an axis of a second one of the generator disks are non-parallel.

13. The power generating system of claim 1, wherein a plurality of the generator disks are magnetically coupled to a single one of the at least one flywheel.

14. The power generating system of claim 1, further comprising a plurality of flywheels, wherein each generator disk is magnetically coupled to a different one of the flywheels.

* * * * *